(12) United States Patent
Schonfelder

(10) Patent No.: US 11,414,209 B2
(45) Date of Patent: Aug. 16, 2022

(54) MOBILE LAUNCH PAD FOR FACILITATING LAUNCHING AND LANDING OF FLYING TAXIS

(71) Applicant: William David Schonfelder, Killeen, TX (US)

(72) Inventor: William David Schonfelder, Killeen, TX (US)

(73) Assignees: Dennis Bragg, Chantilly, VA (US); Lynda M Schonfelder, Killen, TX (US)

( * ) Notice: Subject to any disclaimer, the term of this patent is extended or adjusted under 35 U.S.C. 154(b) by 443 days.

(21) Appl. No.: 16/709,658

(22) Filed: Dec. 10, 2019

(65) Prior Publication Data

US 2021/0171214 A1    Jun. 10, 2021

(51) Int. Cl.
*B64F 1/00* (2006.01)
*B64C 39/02* (2006.01)
*G08G 5/00* (2006.01)

(52) U.S. Cl.
CPC .......... *B64F 1/007* (2013.01); *B64C 39/024* (2013.01); *G08G 5/0013* (2013.01); *G08G 5/0069* (2013.01); *B64C 2201/027* (2013.01); *B64C 2201/146* (2013.01)

(58) Field of Classification Search
CPC ........ B64C 2201/027; B64C 2201/042; B64C 2201/088; B64C 2201/108; B64C 2201/128; B64C 2201/146; B64C 2201/18; B64C 39/024; B64F 1/007; B64F 1/04; B64F 1/22; G08G 5/0013; G08G 5/0069
USPC ................................ 455/575.1, 99; 446/212
See application file for complete search history.

(56) References Cited

U.S. PATENT DOCUMENTS

| | | | | |
|---|---|---|---|---|
| 3,736,836 A | * | 6/1973 | McAllister | F41F 3/0406 446/212 |
| 9,973,261 B1 | * | 5/2018 | Hardy | G05D 1/104 |
| 2019/0002127 A1 | * | 1/2019 | Straus | B64F 1/12 |
| 2020/0180754 A1 | * | 6/2020 | Schonfelder | B64D 1/22 |
| 2021/0129982 A1 | * | 5/2021 | Collins | B64F 3/02 |
| 2022/0101261 A1 | * | 3/2022 | Wiacek | G06Q 10/06315 |

* cited by examiner

*Primary Examiner* — Tan H Trinh
(74) *Attorney, Agent, or Firm* — Dhiraj Jindal; Patent Yogi LLC

(57) ABSTRACT

Disclosed herein is a mobile launch pad for facilitating launching and landing of flying taxis, in accordance with some embodiments. Accordingly, the mobile launch pad may include a platform and at least one propulsion assembly. Further, the platform may include at least one rising panel, a base panel, and at least one lift mechanism. Further, the at least one rising panel may be coupled to the base panel using the at least one lift mechanism. Further, the at least one rising panel in the at least two positions may be configured to support at least one aerial vehicle of a flying taxi. Further, the at least one propulsion assembly may be operationally coupled with the platform. Further, the at least one propulsion assembly may be configured for propelling the platform.

20 Claims, 18 Drawing Sheets

MOBILE LAUNCH PAD FOR FACILITATING LAUNCHING AND LANDING OF FLYING TAXIS

RELATED APPLICATION(S)

Under provisions of 35 U.S.C. § 119e, the Applicant(s) claim the benefit of U.S. provisional application No. 62/778,261, filed on Dec. 11, 2018 and U.S. provisional application No. 62/778,613, filed on Dec. 12, 2018, which is incorporated herein by reference.

TECHNICAL FIELD

Generally, the present disclosure relates to the field of aviation. More specifically, the present disclosure describes a mobile launch pad for facilitating launching and landing of flying taxis.

BACKGROUND

Existing techniques for facilitating launching and landing of flying taxis are deficient with regard to several aspects. For instance, current technologies involve airport type runway systems that may require heavy regulations, legislation, and permissions from local government and authorities. Furthermore, current technologies do not provide complete flexibility to land and/or launch anywhere a company and/or an individual may desire. Further, it is difficult to install known launch pads in areas that are closer to the public spaces. Moreover, current technologies may require boring underground, redesigning buildings, and a lot of additional administrative work.

Therefore, there is a need for improved mobile launch pad for facilitating launching and landing of flying taxis that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a mobile launch pad for facilitating launching and landing of flying taxis, in accordance with some embodiments. Accordingly, the mobile launch pad may include a platform and at least one propulsion assembly. Further, the platform may include at least one rising panel, a base panel, and at least one lift mechanism. Further, the at least one rising panel may be coupled to the base panel using the at least one lift mechanism. Further, the at least one lift mechanism may be configured to move the at least one rising panel through at least two panel positions in relation to the base panel. Further, the at least one rising panel in the at least two positions may be configured to support at least one aerial vehicle of a flying taxi. Further, the at least one propulsion assembly may be operationally coupled with the platform. Further the at least one propulsion assembly may be configured for propelling the platform.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
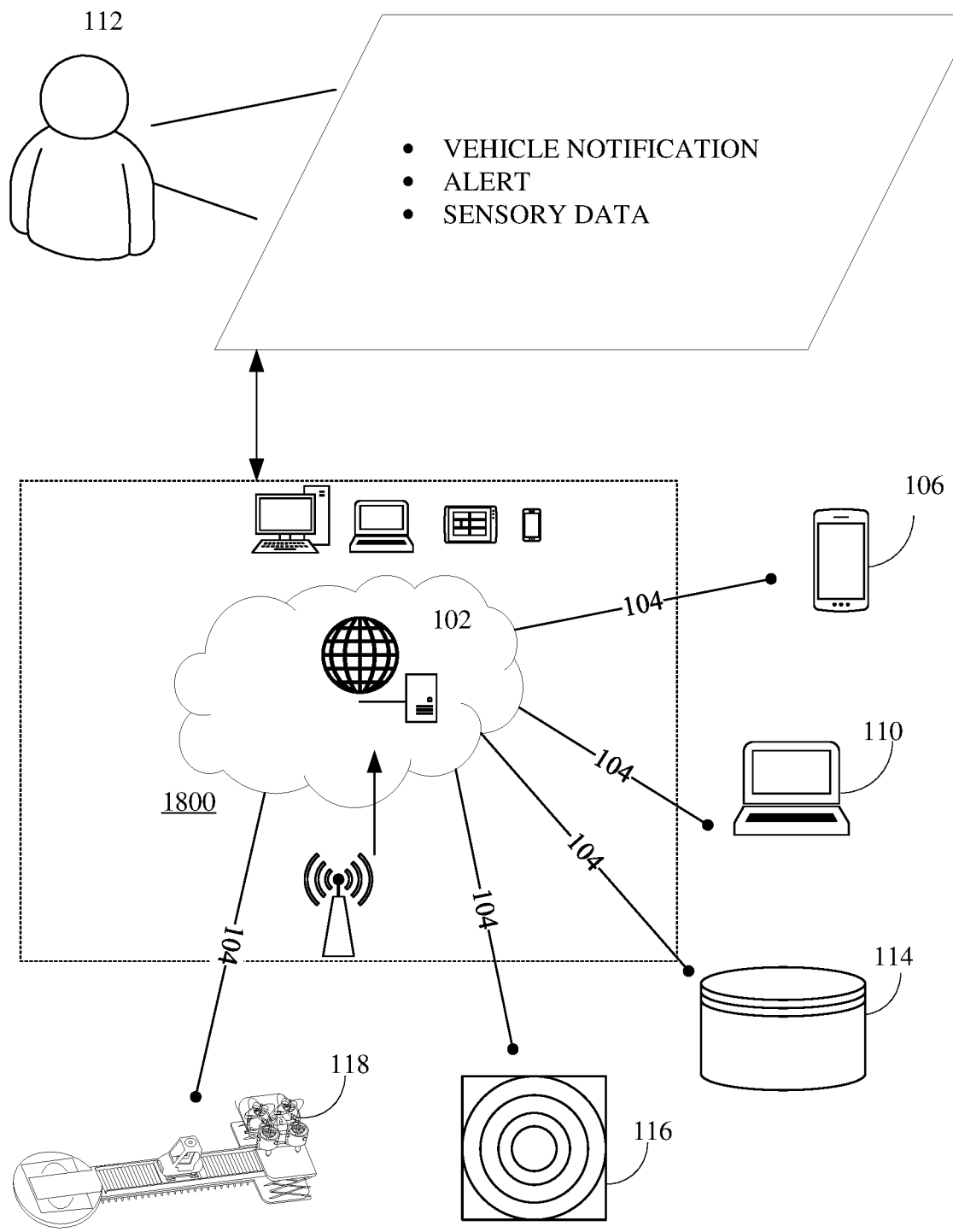
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of mobile launch pad for facilitating launching and landing of flying taxis, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a mobile launch pad (or station) for facilitating launching and landing of flying taxis. Further, the mobile launch station, in an instance, may be configured to facilitate take-off and landing of a drone taxi (comprising of a drone and a passenger pod). Further, the mobile launch station, in an instance, may include a stop platform coupled to a scissor lift and configured to support the drone and raise the drone to a predetermined height to facilitate mechanical coupling with the passenger pod. Further, the drone taxi may not include an operator pilot in the passenger pod for two purposes. Further, the first purpose may not require a pilot's license to be flown if it was flown by a remote licensed pilot from a command center, which could allow this to go around the FAA ruling. Further, the second purpose may be the rules of the contest and weight restrictions. Further, the drone taxi may be associated with a software application (or platform).

Further, the software application (such as Chariots Of Fire app) may show how close the destination dock is near a user and how long it will take to get to your arrival point. Using the software application information, the user set out to find the nearest dock. To your surprise, there is one only a block away and you head out toward it. Further, the software application shows the user getting closer to the dock that you picked out earlier. When the user arrives at the mobile launch station (or COF station), the user may see a screen that has some information on it. The user may enter the requested information like in an ATM machine. From the station, the user may hear an audible voice given the user some instructions and directions on what is required of the user before purchasing a ride. The questions may be specific to the design of the flying taxi. Once all the questions have been entered, the information is immediately sent to the command remote flight center for approval in another location. The user thinks it is no different than entering a terminal in an airport. The audible voice is instructing you to stay near the terminal while the taxi drone is being flown to your location. While waiting for the taxi you purchase your flight time. About a few minutes (may be 10 minutes) later, the user may see a quiet flying drone approach the landing near the user. Further, the user may hear more audible warnings and lights being given in the area to make sure that everything is clear and is working as intended. Further, a remotely piloted flying taxi being piloted by a certified airliner pilot may be monitoring everything with full telemetry and visual cameras that are installed on the drone, the station and the cargo pod. Further, the remote pilot land the craft in a precision maneuver and let the engines idle down. The passenger station and the flying taxi cab gives the ok to enter the taxi. The user notice how bare it inside yet very comfortable with a small screen, stereo, music, heat and ac. It gives the user an impression of flying first class. The inside of the passenger pod is giving instructions to follow all safety measures or the craft will not take off and the flight is aborted. Once the remote pilots feel that everything is going as planned, they start up the engines and begin the preprogrammed flight pattern to the next arrival point. Further, the drone taxi flies straight up and stay on course using telemetry and the visual remote pilot's guidance. Further, the passenger pod may include a small TV screen with a friendly welcome message for the user about flight. Further, the user may turn up the music and settle back for the ½ hour trip you are about to experience. Upon looking out, the user may see other drone taxis taking other routes and you feel like your back in the cartoon TV series The Jetsons, only this time it is for real. As the user approach the arrival point the camera comes on and thanks the user for your use of the taxi service. As the user feel the drone begin to descend you hear more audible instruction on what to do before leaving the craft. Further, the drone taxi tells the user that your seat belt is fastened and will only release when the engines come to the full idle or stop that the remote pilot will tell the drone taxi do. Further, the landing is smooth and stable. Further, the engines begin to idle down and the drone taxi is telling you to leave the craft and thanks the user for time. Using the software application, the user may see that arrival landed the user within walking distance of your restaurant. Further, the user may see a friend waving and greeting the user.

Further, the mobile launch station, in an instance, may include a mobile tram that may be configured to move the stop platform to a launching area. Further, implementation of the complete mobile launch station and drone taxi system may require the hiring of one or more professionals of various fields. Further, degreed engineers specialized in various disciplines of electronics may be required. Further, networking specialist to troubleshoot all IT problems such as an app, equipment, computers, monitors, and all telemetry may be needed. Further, programmers to write apps, programs, and code for flight controllers and telemetry may be required. Further, a ground crew consisting of non-technical people who may help with quality control, inspections, loading of craft and docking may be required. Further, people with some mechanical skills for repairs may be needed. Further, an administration may be needed, consisting of people who may communicate with consumers and may have knowledge of billing, greeting, setting appointments, troubleshooting, monitoring quality control, hiring employees. Further, captains may be needed, such as pilots skilled in avionics, test pilots, wind experts, weather experts, knowledge in flight dynamics, working with other aircraft controllers, direction, and all things related to flying. Further technicians such as people who can repair, replace or stock parts may be needed. Further, technicians may also be able to read radars and interrupt telemetry with problem-solving ideas on fly. Further experts in Communications may be required, such as personnel who may be able to read satellite data, communicate with commercial aircraft and other control towers. Further, a maintenance manager may be needed for developing and maintaining a maintenance program including using the Maximo program that may meet and exceed safety and operations goals. Further, the maintenance manager may develop and run the maintenance program to achieve an excellent standard of goals and may comply with all regulatory guidelines and safety. Further, the maintenance manager may set up and run the Maximo program, lead preventive and proactive maintenance schedules, workflow, work orders and workflow approval through the Maximo program. Further, the maintenance manager may coordinate events, after work hour call outs and develop and drive reliability vision goals. Further, the maintenance manager may lead and oversee annual and quarterly performance evaluations and performance improvement plans. Further, a certified pilot may be required for the operation of the drone taxi and may be responsible for the safety of the one or more passengers. Further, the certified pilot may be responsible for any flight decisions once the drone taxi may start its operation. Further, a safety manager may be required to provide appropriate safety, health, accident prevention, and investigation training for other managers and supervisors. Further, the safety manager may assist management in annual inspection of workplaces to assure safe and healthful conditions for workers and flight occupants. Further, the safety manager may provide materials and develop and administer systems to promote a safe and healthful workplace, flight station, and flight. Further, the safety manager may support safety management by recording all accident reports in a complete and accurate manner and may make sure that all claims for injuries and illness reported may be posted in an Occupational Safety and Health Administration log. Further, an Operations manager may be required to oversee the production of drawings and provision of services and may make sure the organization is running. Further, the operations manager may ensure a smooth efficient friendly service that may meet and exceed expectations and needs of customers and clients.

Further, the operations manager may interact with managers of different areas of an organization as well as training and supervising new employees and tracking and measuring staff. Further, the operations manager may plan and control change using the management of change (MOC) form. Further, the operations manager may manage quality assurance programs. Further, the operations manager may be required for setting, reviewing budgets and managing and overseeing inventory, distribution of goods and facility layout. Further, a Purchasing manager may be involved in all aspects of business and may develop and find cost-saving to corporate strategy. Further, the purchasing manager may review proposals for new projects in a timely manner, and maintain frequent interaction with a marketing team to discuss flight sales proposals and marketing strategies. Further, the purchasing manager may be required to handle contract negotiation, maintain excellent repose with vendors and clients, and supervise purchasing agents and clerks. Further, a marketing manager may be required for managing all marketing and activities within the marketing department. Further, the marketing manager may be required for developing the best marking strategy in line with objectives and goals, co-coordinating marketing campaigns with sales activities. Further, the marketing manager may be required for overseeing the marketing budget. Further, the marketing manager may be required for the creation and publication of all marketing material in line with marketing plans. Further, the marketing manager may be required for planning and implementing promotional campaigns for measuring results and may carry overall responsibility for brand management and corporate identity. Further, the marketing manager may be required for preparing online and print marketing campaigns, creating a limitless range of marketing materials and working closely with design agencies and assist with product launches. Further, a human resource manager may be required to maintain and enhance human resources by implementing, planning and evaluating employee relations and human resources policies, programs, and practices. Further, the human resource manager may be responsible for the day to day management of HR operations and may manage an administration of policies, procedures, and programs including payroll, employee recognition program, and hiring and termination of an employee.

Further, implementation of the complete mobile launch station and drone taxi system may require the construction of few buildings. Further, a mission control launch center building may be required for housing a mobile tram system, launch area, and storage of parts to replace pods on the drones and may also be a charging station for batteries. Further, an administration building and remote pilot center may be required to house pilots, electronics for the telemetry and equipment to fly the drone taxis by remote. Further, computers may be stored here along with all administrations.

Further, implementation of complete mobile launch station and drone taxi system may require equipment such as tram system, storage house with charging station, repair shop and mechanics, laptops, computers, monitors, flying equipment (like a drone predator), radar equipment, satellite equipment, desks, office equipment, transportation, vehicles for service and retrieval or delivery of drones, manufacturing house to create the drones and passenger pods, and may include a 3D printer, CNC machines, and electronics lab, motor repair station, and so on. Further, the drone taxis may allow more power for a light design with a reliable rechargeable battery.

Further, the mobile launch station, in an instance, may include a mobile tram that may be configured to move the stop platform to a launching area (that may be referred to as a launching pad). Further, the mobile launch station may be a launching station that may be configured to launch the drone taxi. Further, the drone taxi may be a combination of the passenger pod and the drone. Further, the passenger pod, in an instance, may be a shell and/or a capsule that may be configured to house one or more passengers. Further, in some embodiments, the passenger pod may also be configured to house cargo that may need to be transported from a pickup location to a destination. Further, the drone, in an instance, may be configured to carry the passenger pod aerially from the pickup location to the destination. Further, the mobile launch station may be remotely controlled by a remote control station. Further, the mobile launch station may be portable and/or may be configured to be relocated from one location to another. Further, the mobile launch station, in an instance, may be a mobile and transportable set of equipment that may be placed without a special need to modify or redesign any building or a rooftop. Further, the mobile launch station may not require boring underground or redesigning buildings. Further, the mobile launch station may just require a suitable flat surface such as a concrete floor. Further, the mobile launch station may require less investment as compared to known airport runway roof systems. Further, the mobile launch station may also help to avoid heavy regulations, legislation, and permissions from local government and authorities. Further, the mobile launch station, in an instance, may be installed for launch and/or take off in areas that may be closer to public use. Further, the mobile launch station may be located in places such as (but not limited to) existing parking lots, open lots, grass parks, pavements, church lots, and/or any place that may include an open space and/or a concrete pad. Further, the mobile launch station, in an instance, may be designed to load, dock, and/or couple the passenger pod and the drone to form the drone taxi. Further, the mobile launch station may offer flexibility to the drone taxi to land or launch from any location the one or more passengers may desire.

In an exemplary embodiment, the mobile launch station may be a small footprint landing pad. Further, the landing pad may be a small non-movable pad that may provide a permanent location for the drone taxis. Further, the small footprint landing pad, in some embodiments, may be a bus stop styled roof and/or a stretched out landing pad. Further, the bus stop styled roof and/or the stretched out landing pad, in an instance, may provide a large diameter landing pad. Further, the large diameter landing pad, in an instance, may be required in certain scenarios, where it is difficult to ensure pinpoint accuracy for landings. In some scenarios, a 10-foot marginal error for landing may be required by the drone taxi. Further, the small footprint landing pad may have a small footprint and may not be an eyesore to the general public.

Further, the mobile tram, in an instance, may incorporate various elements such as (but not limited to) a launching pad, a conveyer belt, a stop platform, and so on. Further, the mobile tram, in an instance, may be configured to carry the drone taxi to the launching pad. Further, the mobile tram, in an instance, may be inspected by a remote control station. Further, the remote control station, in an instance, may be configured to lock the mobile tram in a position that may facilitate receiving the passenger pod and the drone. Further, in an exemplary embodiment, the mobile tram may be having dimensions such as length 32 feet 2.125 inches and breadth 4 feet 6 inches. Further, in an exemplary embodiment, a radius of the launching pad may be 6 feet 3.6875 inches.

Figure 14:
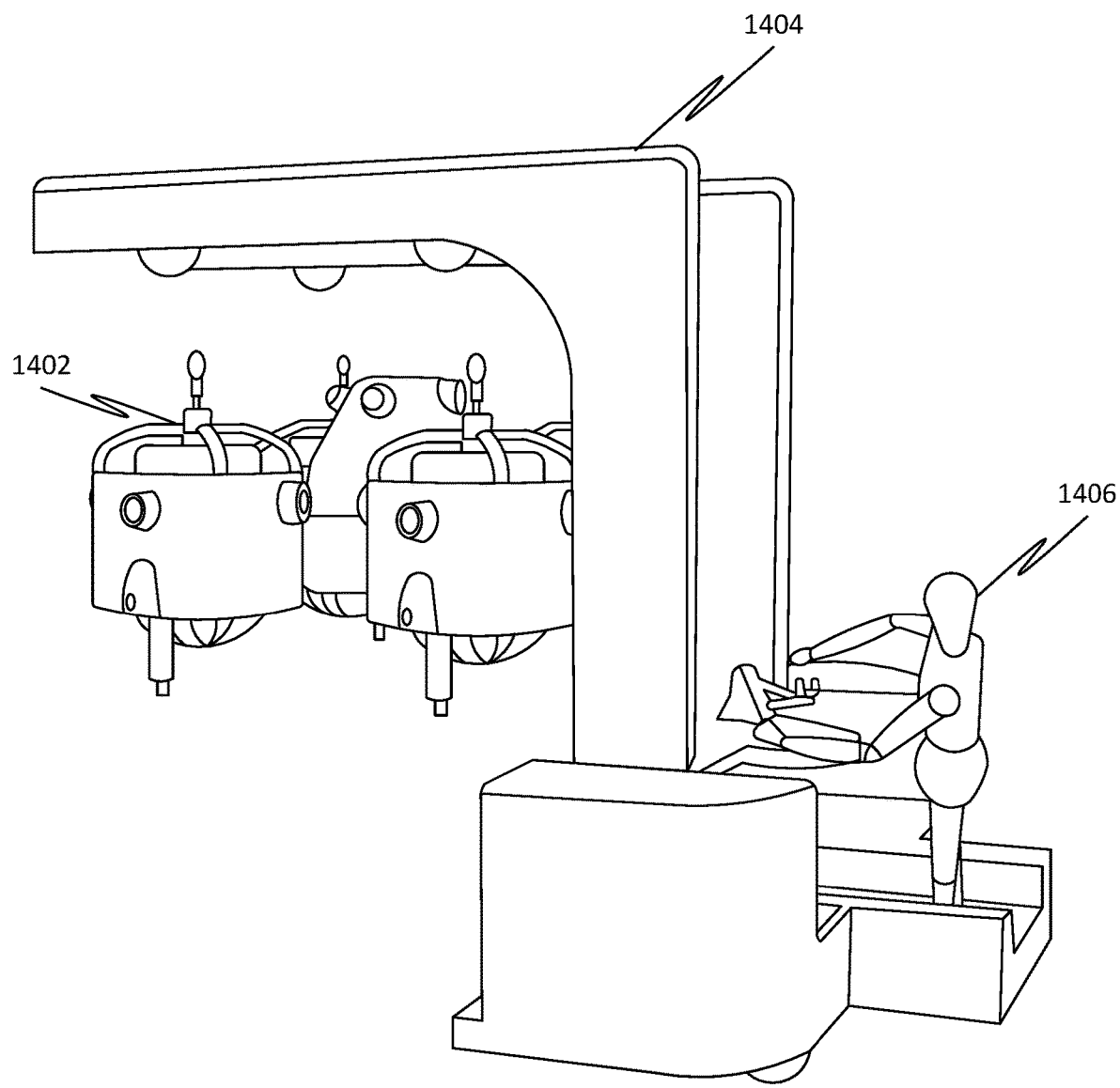
FIG. 14 is a perspective view of a drone being lifted up by using a forklift, in accordance with exemplary embodiments.

Further, the mobile tram, in an instance, may be configured to be locked into a position to receive the passenger pod and the drone. Further, the passenger pod, in an instance, may be picked up automatically (and/or manually) by a set of built-in handles. Further, the passenger pod, in an instance, may be secured to the mobile tram of the mobile launch station by using a pair of specially designed connector plates. Further, a forklift (as shown in FIG. 14), in an instance, may be used to position the drone into a pair of positioning feet holders on the stop platform of a scissor lift. Further, the scissor lift, in an instance, may include the stop platform that may be raised and/or lowered through a movement of crossed supports pivoted like two halves of a pair of scissors. Further, before and after securing the drone and the passenger pod, a quality inspection checklist and/or a thorough inspection may be performed (automatically and/or manually through the remote control station) on all parts and equipment of the mobile launch station.

Further, the passenger pod, in an instance, may be moved into a docking position using a cable until the passenger pod stops at the stop platform. Further, the drone that may be secured into the pair of positioning feet holders on the stop platform of the scissor lift. Further, in an instance, the drone may be lifted to a predetermined height by using the scissor lift. Further, once the predetermined height may be reached, a preprogrammed instruction may be given to the drone, and the drone may move into a position to connect to the passenger pod. Further, the drone, in an instance, may be placed securely on the passenger pod with the help of the scissor lift. Further, in an exemplary embodiment, the scissor lift may have dimensions such as breadth 7 feet 4.6875 inches and length 16 feet 8.125 inches. Further, the mobile tram, in an instance, may be configured to be locked into a position to receive the passenger pod and the drone. Further, the mobile tram may incorporate the launching pad.

Further, once the drone and the passenger pod are secured with each other through a locking mechanism, the stop platform may be lowered down by using the scissor lift. Further, the scissor lift with a lowered stop platform may then retreat backward away from the drone taxi and/or may return to a home position. Further, the drone taxi, in an instance, may be moved onto the launching pad of the mobile launch station for final take off. Further, one or more of remote flying pilots, in an instance, may take control over the drone taxi and/or may remotely fly the drone taxi to a destination.

Further, before the takeoff of the drone taxi, the remote control station, in an instance, may program the drone taxi to receive data from the remote control station. Further, the data received, in an instance, may include a set of instructions and/or set of duties that the drone taxi may perform. Further, the data sent to the drone taxi from the remote control station may be analyzed and/or handled by a skilled team of remote pilots, engineers, and so on. Further, the mobile launch station may be installed on the ground. Further, the drone taxi may take off from a mobile launch station installed on the ground. Further, the mobile launch station may be installed on the top of the building.

Further, the mobile launch stations may facilitate fully monitored takeoffs and landings by professional pilots. Further, the mobile launch stations may not need to build a new building or get permits to land on rooftops with unique and original launch pads.

Once the mobile launching station/platform has been inspected and locked into a position to receive the passenger pod and drone. A crew of 4, which we call Team A (first team) may pick up the 174 lbs. drone by the built-in handles and set in place on the back of the platform securing into place within the molded positioning feet holders. While this operation is happening on one of the launching platforms another group of men which we call Team B (second team) may pick up the 206 lbs. passenger pod by the built-in handles and secure this pod to the sliding locking platform using the designed modeled area. Before and after each team secures the drone and pod a quality inspection checklist is performed and a thorough inspection is performed. Once the team gives a green light to the secured drone and pod, the remote flight mission center in another building is programming the drone to receive its set of instructions on the duties it is to perform. This programmed information is handled by a skilled team of remote pilots, engineers, and personal all required carrying out these tasks. The mobile launching platform either is operated by the remote flight mission center or the two teams (first and second team).

Further, the Mobile Launch Station (MLS) will be a huge money saving investment that will out-compete our competition. Most of the other flying taxi companies are proposing full building type airport runway roof systems. This results in heavy regulations, legislations, and permissions from local government and authorities. Further, the mobile launch station may use existing parking lots, open lots, grass parks, pavements, church lots, anything that will have an open space and a concrete pad. Our equipment is designed to load, dock, and couple with our MLS system. Further, the mobile launch station is a mobile and transportable set of equipment without any special needs to moderate or redesign the buildings or its rooftops. Further, the mobile launch station offers the flying taxi company complete flexibility to land or launch anywhere the company desires to land as long as it can withstand the weight of the mobile launch station. By having this much availability, it will allow installation, launching or take off in areas that are closer to public use. It will also reduce the need for heavy regulations and legislation on any city or government. This can have a huge impact on other foreign countries and continents. Using the mobile launch station will truly be a world changer in how the public will be impacted for convenience and comfort without a huge hit to the taxpayer. We are not boring underground, we are not redesigning the wheel or the buildings, all we need are sustainable concrete pads to use the mobile launch station transportation system on.

Further, Small Footprint Landing Pads (SFLP). Further, the SFLP may not be packaged with the MLS. These smaller non movable designed pads will be a more permanent location for the flying taxis to use. They are simple in design to serve a simple purpose and use. Think of the SFLP as a larger version of an ATM machine only with a bus style stop roof and a stretched out landing pad. The reason for the very large diameter of the landing pad is needed because as we all know pinpoint accuracy landings are not perfected. We will need a 10-foot marginal error for landing by the remote pilot. The cost of these will be no greater than a poured driveway. The SFLP has a small footprint and will not be an eyesore to the general public. It will be up to each country or city to decide if they want a more barrier type of protection during landing and takeoff for the flying taxi.

Now referring to figures, FIG. 1 is an illustration of an online platform 100 consistent with various embodiments of the present disclosure. By way of non-limiting example, the online platform 100 to facilitate launching and landing of flying taxis may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116, and a mobile launch pad 118 over a communication network 104, such as, but not limited to, the Internet. Further, users of the online platform 100 may include relevant parties such as, but not limited to, end-users, administrators, passengers, tourists, logistics companies, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1800.

Figure 2:
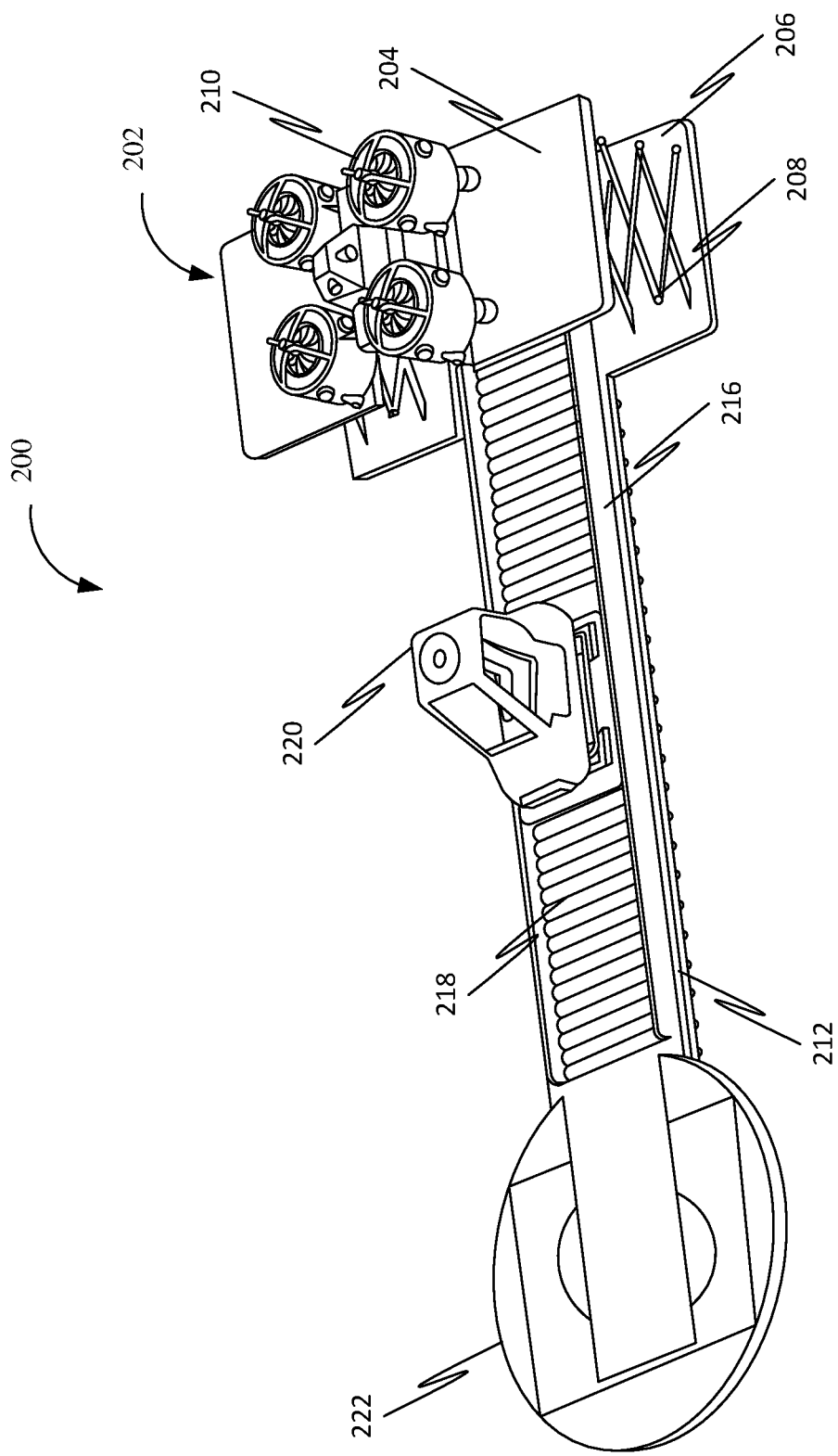
FIG. 2 is a mobile launch pad for facilitating launching and landing of flying taxis, in accordance with some embodiments.

FIG. 2 is a mobile launch pad 200 for facilitating launching and landing of flying taxis, in accordance with some embodiments. Accordingly, the mobile launch pad 200 may include a platform 202 and at least one propulsion assembly 212.

Further, the platform 202 may include at least one rising panel 204, a base panel 206, and at least one lift mechanism 208. Further, the at least one rising panel 204 may be coupled to the base panel 206 using the at least one lift mechanism 208. Further, the at least one lift mechanism 208 may be configured to move the at least one rising panel 204 through at least two panel positions in relation to the base panel 206. Further, the at least one rising panel 204 in the at least two positions may be configured to support at least one aerial vehicle 210 of a flying taxi. Further, the at least two panel position may be associated with the at least one rising panel 204 at a bottom position and a top position. Further, the at least one rising panel 204 at a bottom position may be more proximal to the base panel 206 as compared to the at least one rising panel 204 at the top position. Further, the at least one lift mechanism 208 may include a scissor lift, a hydraulic lift, a pneumatic lift, etc.

Further, the at least one propulsion assembly 212 may be operationally coupled with the platform 202. Further, the propulsion assembly 212 may include a belt conveyor system, an aero mechanical conveyor system, a pneumatic conveyor system, a gravity conveyor system, etc. Further, the at least one propulsion assembly 212 may be configured for propelling the platform 202.

Figure 3:
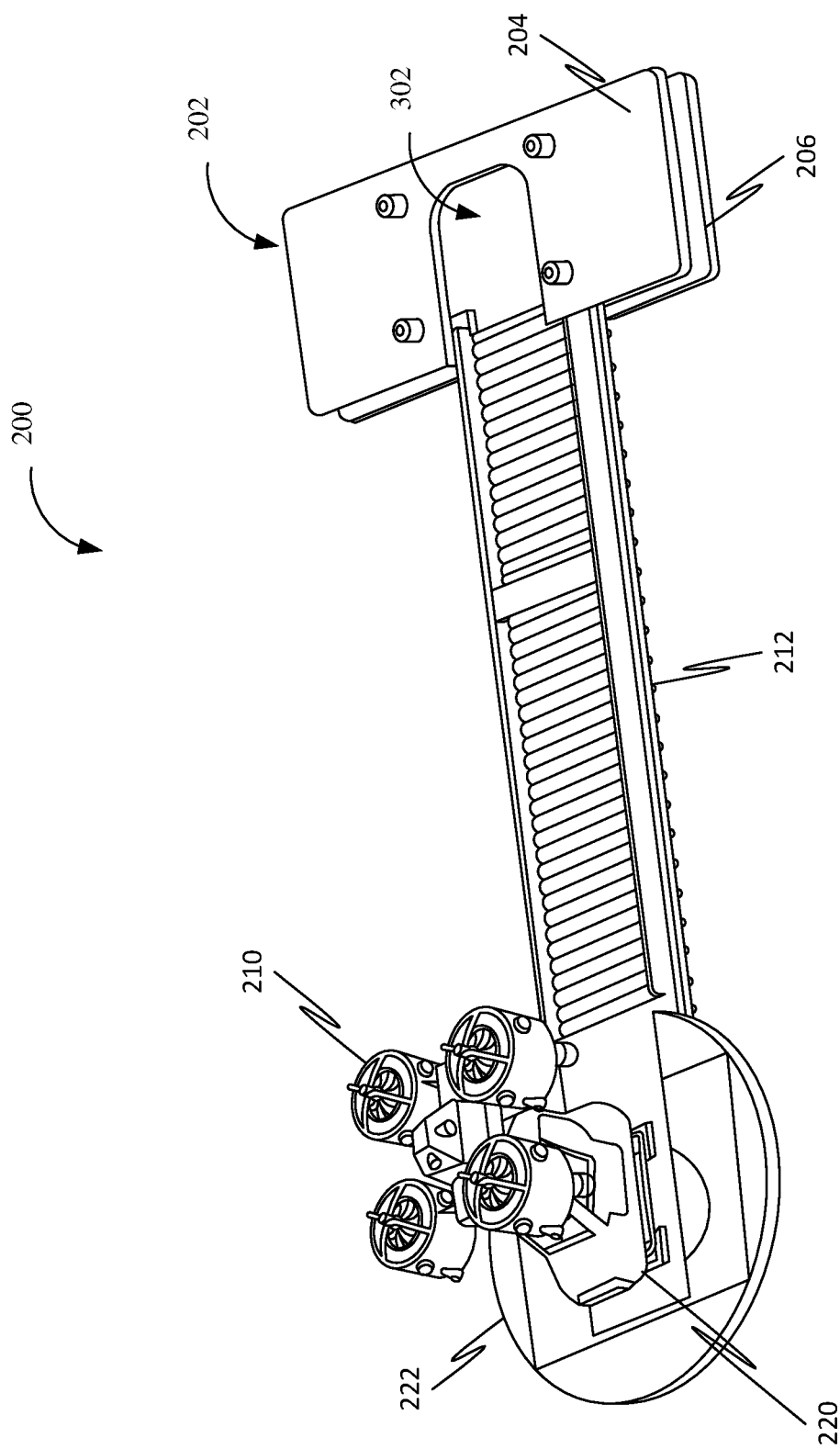
FIG. 3 is a perspective side view of the at least one aerial vehicle with the passenger pod getting ready for takeoff from the mobile launch pad, in accordance with exemplary embodiments.

Further, in some embodiments, the at least one rising panel 204 may include a rising panel cutaway 302 as shown in FIG. 3. Further, the base panel 206 may include a base panel cutaway (not shown). Further, the base panel cutaway may be overlapped by the rising panel cutaway 302. Further, each of the rising panel cutaway 302 and the base panel cutaway forms a panel space. Further, the panel space may be configured to accommodate the flying taxi. Further, the panel space may include a three dimensional empty space that may facilitate motion of the flying taxi. Further, the three dimensional empty space may be cubical, cylindrical, parallelepiped in shape.

Further, in some embodiments, the at least one rising panel 204 may include a first rising panel (not shown) and a second rising panel (not shown). Further, the first rising panel may be separated from the second rising panel by a rising panel space (not shown). Further, the base panel 206 may include a first base panel (not shown) and a second base panel (not shown). Further, the first base panel may be separated from the second base panel by a base panel space (not shown). Further, each of the rising panel space and the base panel space forms a panel space. Further, the panel space may be configured to accommodate the flying taxi. Further, the panel space may include a three dimensional empty space that may facilitate motion of the flying taxi. Further, the three dimensional empty space may be cubical, cylindrical, parallelepiped in shape.

Further, in some embodiments, the at least one lift mechanism 208 may be configured to move the first rising panel and the second rising panel through the at least two panel positions in relation to the base panel 206 synchronously. Further, the first rising panel and the second rising panel in the at least two panel positions may be configured to support the at least one aerial vehicle 210.

Further, in some embodiments, the at least one lift mechanism 208 may be configured to move the first rising panel and the second rising panel through the at least two-panel positions in relation to the base panel 206 asynchronously. Further, the first rising panel and the second rising panel in the at least two panel positions may be configured to support the at least one aerial vehicle 210.

In further embodiments, the mobile launch pad 200 may include at least one platform sensor (not shown) disposed on the at least one rising panel 204. Further, the at least one platform sensor may be configured to generate at least one platform sensor data corresponding to at least one physical state of the at least one aerial vehicle 210. Further, the at least one physical state may be associated with a position of the at least one aerial vehicle 210 relative to the at least one rising panel 204. Further, the position may correspond to a distance between the at least one aerial vehicle 210 and at least rising panel 204.

Further, the mobile launch pad 200 may include a processing device (not shown) communicatively coupled with the at least one platform sensor. Further, the processing device may be configured for analyzing the at least one platform sensor data. Further, the processing device may be configured for generating at least one platform command based on the analyzing. Further, the at least one lift mechanism 208 may be communicatively coupled with the processing device. Further, the at least one lift mechanism 208 may be controllable by the processing device. Further, the at least one lift mechanism 208 may be configured for transitioning the at least one rising panel 204 between the at least two panel positions based on the at least one platform command. Further, the processing device may be disposed on the mobile launch pad 200.

Further, in some embodiments, the processing device may be configured for generating at least one vehicle notification based on the analyzing. Further, the mobile launch pad 200 may include a presentation device (such as mobile device 106, electronic device 110) communicatively coupled with the processing device. Further, the presentation device may be configured for presenting the at least one vehicle notification. Further, the at least one vehicle notification may include a confirmation that may be associated with the launching and landing of the flying taxi.

In further embodiments, the mobile launch pad 200 may include at least one propeller sensor (not shown) disposed on at least one of a rising panel 204 and the base panel 206. Further, the at least one propeller sensor may be configured to generate at least one propeller sensor data. Further, the at least one propeller sensor data corresponds to at least one physical state of the flying taxi. Further, the at least one physical state may be associated with the location of the flying taxi relative to the platform 202. Further, the at least one physical state may facilitate the determination of a distance that may be traced by the platform 202.

Further, the mobile launch pad 200 may include a processing device (not shown) communicatively coupled with the at least one propeller sensor. Further, the processing device may be configured for analyzing the at least one propeller sensor data. Further, the processing device may be configured for generating at least one propeller command based on the analyzing. Further, the at least one propulsion assembly 212 may be communicatively coupled with the processing device. Further, the at least one propulsion assembly 212 may be controllable by the processing device. Further, the at least one propulsion assembly 212 may be configured for propelling the platform 202 in relation to the flying taxi based on the at least one propeller command.

Further, in some embodiments, the platform 202 may include at least one rotating mechanism. Further, the at least one rising panel 204 may be coupled to the base panel 206 using the at least one rotating mechanism. Further, the at least one rotating mechanism may be configured to rotate the at least one rising panel 204 around a vertical axis through a plurality of rotating positions in relation to the base panel 206. Further, the vertical axis may be perpendicular to the at least one rising panel 204. Further, the at least one rising panel 204 may be configured to support the at least one aerial vehicle 210. Further, upon rotating the at least one rising panel 204, the at least one rotating mechanism may facilitate aligning the at least one aerial vehicle 210 with at least one pod 220. Further, the at least one pod 220 may accommodate at least one payload. Further, the at least one payload may include a passenger, a cargo, etc.

In further embodiments, the mobile launch pad 200 may include at least one panel sensor (not shown) disposed on the at least one rising panel 204. Further, the at least one panel sensor may be configured to generate at least one panel sensor data corresponding to at least one physical state of the at least one aerial vehicle 210. Further, the at least one physical state may be associated with the orientation of the at least one aerial vehicle 210 relative to the at least one rising panel 204.

Further, the mobile launch pad 200 may include a processing device (not shown) communicatively coupled with the at least one panel sensor. Further, the processing device may be configured for analyzing the at least one panel sensor data. Further, the processing device may be configured for generating at least one panel command based on the analyzing. Further the at least one rotating mechanism may be communicatively coupled with the processing device. Further the at least one rotating mechanism may be controllable by the processing device. Further the at least one rotating mechanism may be configured to rotate the at least one rising panel 204 through the plurality of rotating positions based on the at least one panel command. Further, the processing device may be disposed on the mobile launch pad 200.

Further, in some embodiments, the at least one propulsion assembly 212 may include a conveyor assembly. Further, the conveyor assembly may include a stationary member 216 and a moving member 218. Further, the stationary member 216 may include a stationary body. Further, the stationary body extends to at least one body length. Further, the moving member 218 may be configured to move through a plurality of member positions in relation to the stationary body corresponding to the at least one body length. Further, the moving member 218 and the stationary member 216 may be configured for propelling the platform 202 through the plurality member positions. Further, the conveyor assembly may include a belt conveyor, a roller conveyor, a chain conveyor, a line shaft roller conveyor, etc.

In further embodiments, the mobile launch pad 200 may include at least one launching panel 222 operationally coupled with the conveyor assembly. Further, the at least one launching panel 222 may be configured to support the flying taxi during landing and take-off of the flying taxi. Further, the conveyor assembly may be configured to propel the platform 202 to the at least one launching panel 222. Further, the at least one launching panel 222 may be configured to bear weight of the flying taxi and the payload carried by the flying taxi during launching and landing of the flying taxi. Further, the at least one launching panel 222 may be made up of concrete, tarmacadam, etc. Further, the at least one launching panel 222 may be associated with a geometrical shape. Further, the geometrical shape may include a circle, a square, a rectangle, etc.

FIG. 3 is a perspective side view of the at least one aerial vehicle 210 with the at least one pod 220 getting ready for takeoff from the mobile launch pad 200, in accordance with exemplary embodiments.

Figure 4:
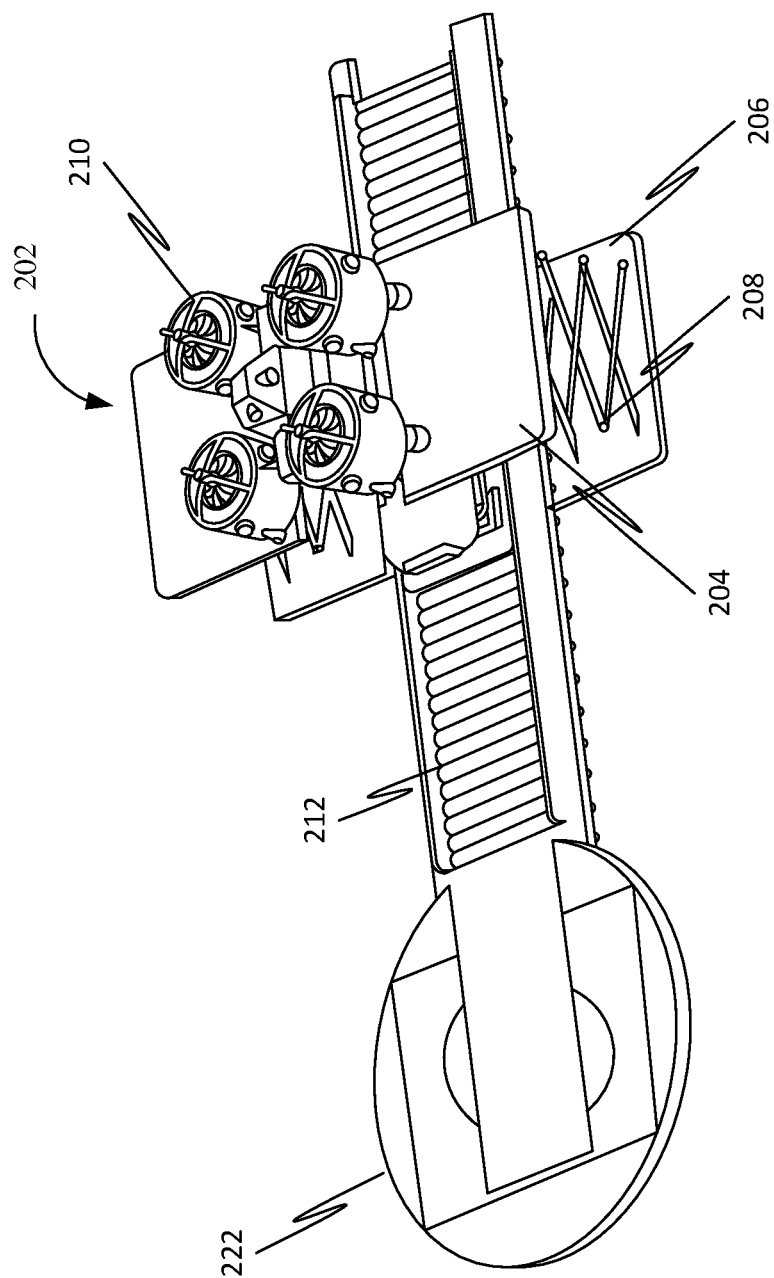
FIG. 4 is a perspective side view of the mobile launch pad, in accordance with exemplary embodiments.

FIG. 4 is a perspective side view of the mobile launch pad 200, in accordance with exemplary embodiments.

Figure 5:
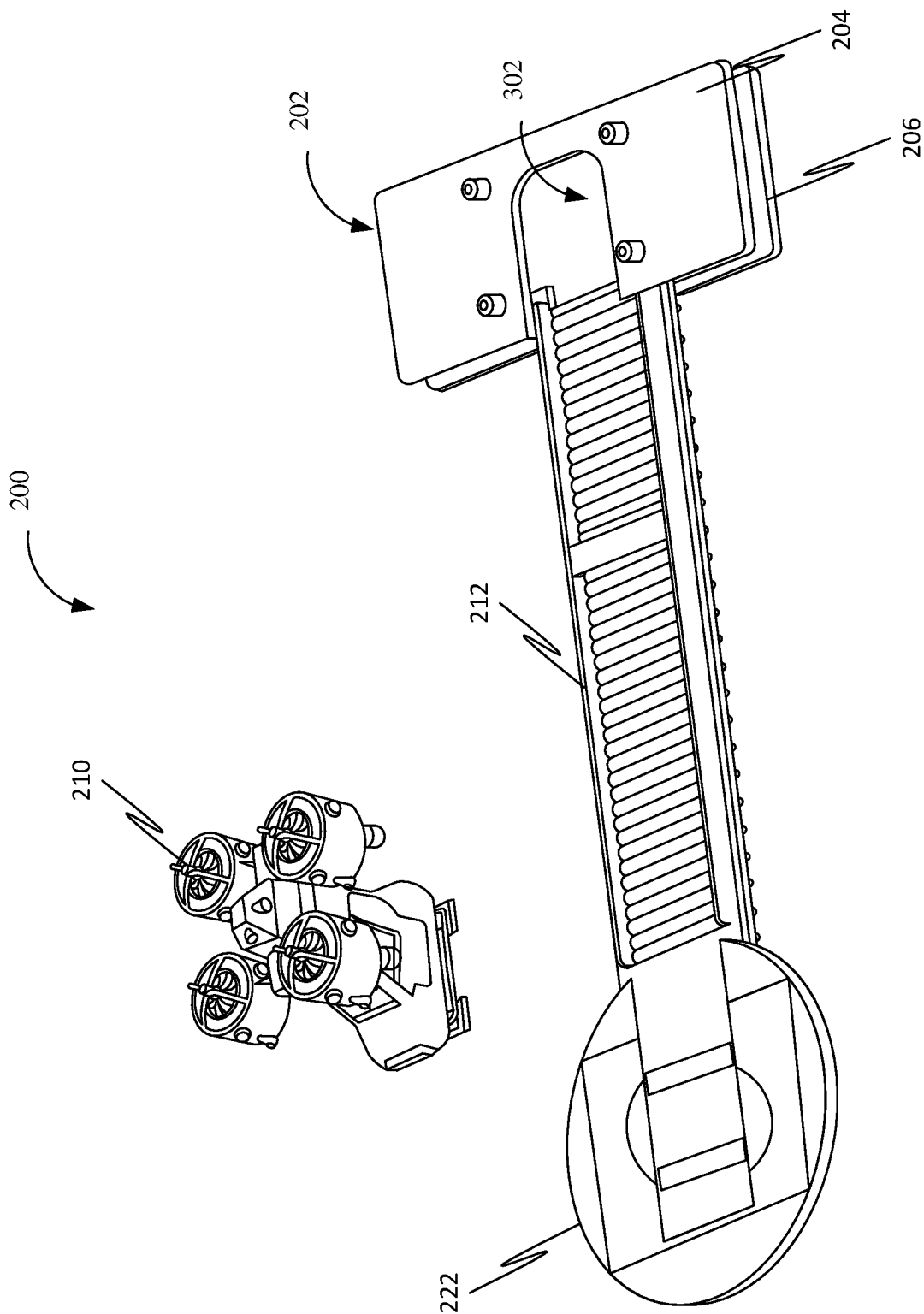
FIG. 5 is a perspective side view of the at least one aerial vehicle with the passenger pod taking off from the mobile launch pad, in accordance with exemplary embodiments.

FIG. 5 is a perspective side view of the at least one aerial vehicle 210 with the at least one pod 220 taking off from the mobile launch pad 200, in accordance with exemplary embodiments.

Figure 6:
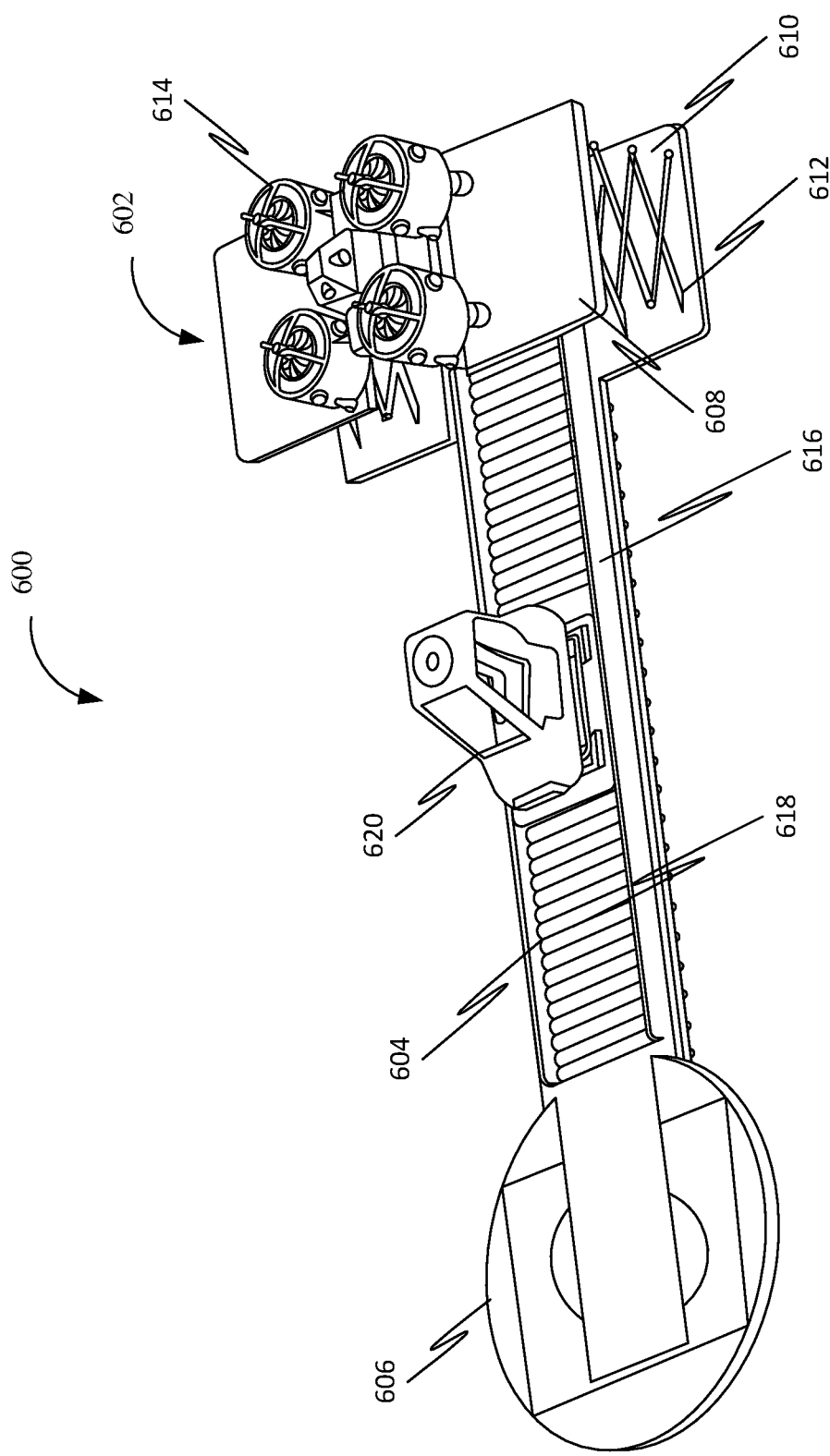
FIG. 6 is a mobile launch pad facilitating launch and landing of flying taxis, in accordance with exemplary embodiments.

FIG. 6 is a mobile launch pad 600 facilitating launch and landing of flying taxis, in accordance with exemplary embodiments. Accordingly, the mobile launch pad 600 may include a platform 602, at least one conveyor assembly 604, and a launch platform 606.

Further, the platform 602 may include at least one rising panel 608, a base panel 610, and at least one lift mechanism 612. Further, the at least one rising panel 608 may be coupled to the base panel 610 using the at least one lift mechanism 612. Further, the at least one lift mechanism 612 may be configured to move the at least one rising panel 608 through at least two panel positions in relation to the base panel 610. Further, the at least one rising panel 608 may be configured to support at least one aerial vehicle 614 of a flying taxi. Further, the at least two panel position may be associated with the at least one rising panel 608 at a bottom position and a top position. Further, the at least one rising panel 608 at a bottom position may be more proximal to the base panel 610 as compared to the at least one rising panel

608 at the top position. Further, the at least one lift mechanism 612 may include a scissor lift, a hydraulic lift, a pneumatic lift, etc.

Further, the at least one conveyor assembly 604 may be operationally coupled with the platform 602. Further, the at least one conveyor assembly 604 may include a stationary member 616 and a moving member 618. Further, the stationary member 616 may include a stationary body. Further, the stationary body extends to at least one body length. Further, the moving member 618 may be configured to move through a plurality of member positions in relation to the stationary body corresponding to the at least one body length. Further, the at least one conveyor assembly 604 may be configured for propelling the platform 602 through the plurality of member positions.

Figure 7:
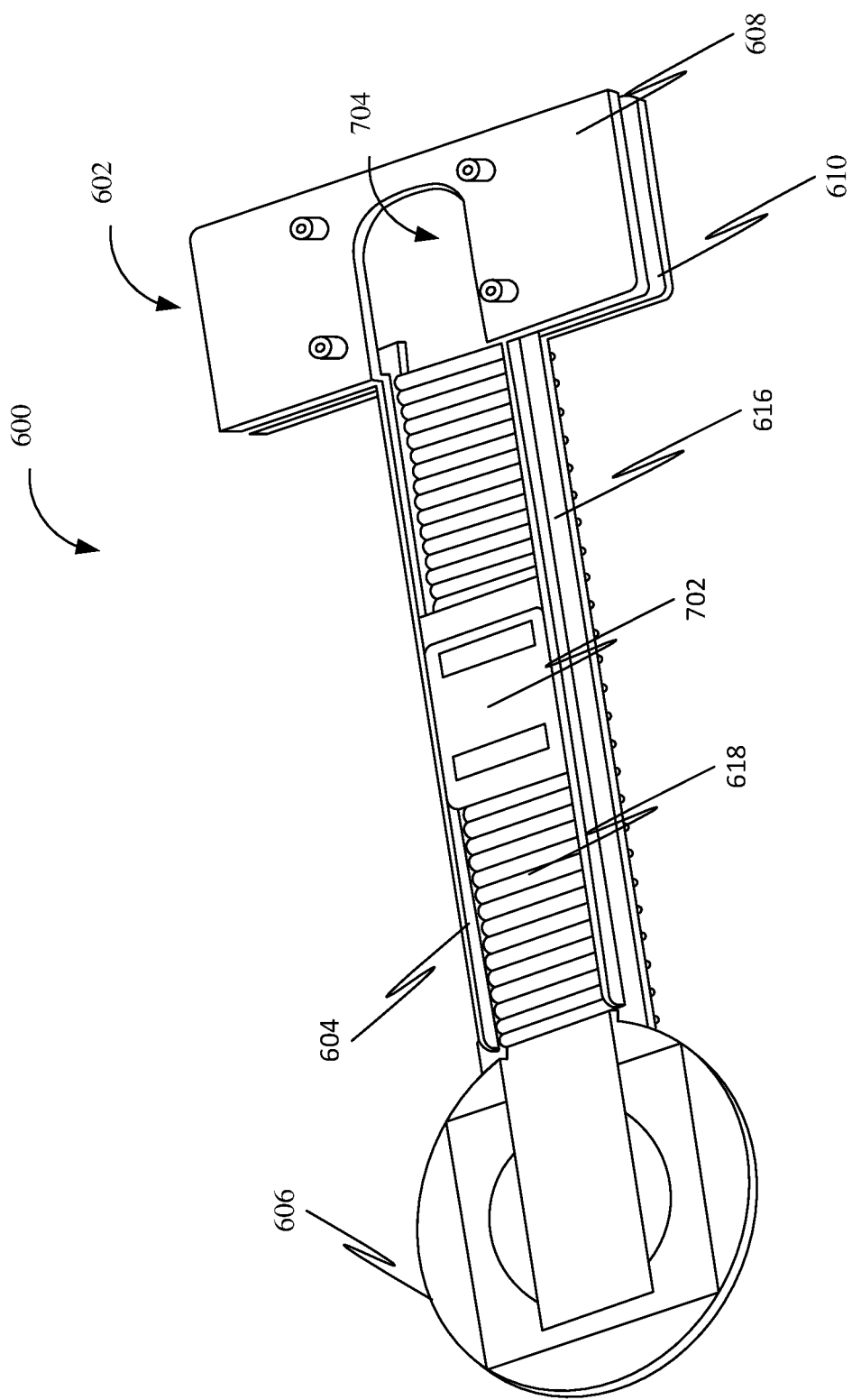
FIG. 7 is a perspective view of the mobile launch pad, in accordance with exemplary embodiments.

Further, the launch platform 606 may include a launch panel 702 as shown in FIG. 7 movably disposed on the launch platform 606. Further, the launch platform 606 may be operationally coupled with the at least one conveyor assembly 604. Further, the launch panel 702 may be configured to support the flying taxi during landing and take-off of the flying taxi. Further, the at least one conveyor assembly 604 may be configured to move the launch panel 702 through the plurality of member positions. Further, the at least one launching panel 702 may be configured to bear weight of the flying taxi and the payload carried by the flying taxi during launching and landing of the flying taxi. Further, the at least one launching panel 702 may be made up of concrete, tarmacadam, etc. Further, the at least one launching panel 702 may be associated with a geometrical shape. Further, the geometrical shape may include a circle, a square, a rectangle, etc.

Further, in some embodiments, the at least one rising panel 608 may include a rising panel cutaway 704 as shown in FIG. 7. Further, the base panel 610 may include a base panel cutaway (not shown). Further, the rising panel cutaway 704 may overlap the base panel cutaway. Further, each of the rising panel cutaway 704 and the base panel cutaway forms a panel space. Further, the panel space may be configured to accommodate the flying taxi. Further, the panel space may include a three dimensional empty space that may facilitate motion of the flying taxi. Further, the three dimensional empty space may be cubical, cylindrical, parallelepiped in shape.

Further, in some embodiments, the at least one rising panel 608 may include a first rising panel (not shown) and a second rising panel (not shown). Further, the first rising panel may be separated from the second rising panel by a rising panel space (not shown). Further, the base panel 610 may include a first base panel (not shown) and a second base panel (not shown). Further, the first base panel may be separated from the second base panel by a base panel space (not shown). Further, each of the rising panel space and the base panel space forms a panel space. Further, the panel space may be configured to accommodate the flying taxi.

Further, in some embodiments, the at least one lift mechanism 612 may be configured to move the first rising panel and the second rising panel through the at least two panel positions in relation to the base panel 610 synchronously. Further, the first rising panel and the second rising panel in the at least two panel positions may be configured to support the at least one aerial vehicle 614. Further, the at least one lift mechanism 612 may include a scissor lift, a hydraulic lift, a pneumatic lift, etc.

Further, in some embodiments, the at least one lift mechanism 612 may be configured to move the first rising panel and the second rising panel through the at least two panel positions in relation to the base panel 610 asynchronously. Further, the first rising panel and the second rising panel in the at least two panel positions may be configured to support the at least one aerial vehicle 614.

In further embodiments, the mobile launch pad 600 may include at least one platform sensor (not shown) and a processing device (not shown). Further, the at least one platform sensor may be disposed on the at least one rising panel 608. Further, the at least one platform sensor may be configured to generate at least one platform sensor data corresponding to at least one physical state of the at least one aerial vehicle 614. Further, the at least one physical state may be associated with the position of the at least one aerial vehicle 614 relative to the at least one rising panel 608. Further, the at least one physical state may be associated with a position of the at least one aerial vehicle 614 relative to the at least one rising panel 608. Further, the position may correspond to a distance between the at least one aerial vehicle 614 and at least rising panel (not shown).

Further, the processing device may be communicatively coupled with the at least one platform sensor. Further, the processing device may be configured for analyzing the at least one platform sensor data. Further, the processing device may be configured for generating at least one platform command based on the analyzing. Further, the at least one lift mechanism 612 may be communicatively coupled with the processing device. Further, the at least one lift mechanism 612 may be controllable by the processing device. Further, the at least one lift mechanism 612 may be configured for transitioning the at least one rising panel 608 between the at least two panel positions based on the at least one platform command. Further, the processing device may be disposed on the mobile launch pad 600.

Further, in some embodiments, the processing device may be configured for generating at least one vehicle notification based on the analyzing. Further, the mobile launch pad 600 may include a presentation device (such as mobile devices 106, electronic devices 110, etc.) communicatively coupled with the processing device. Further, the presentation device may be configured for presenting the at least one vehicle notification. Further, the at least one vehicle notification may include a confirmation that may be associated with the launching and landing of the flying taxi.

Further, in some embodiments, the platform 602 may include at least one rotating mechanism (not shown). Further, the at least one rising panel 608 may be coupled to the base panel 610 using the at least one rotating mechanism. Further, the at least one rotating mechanism may be configured to rotate the at least one rising panel 608 around a vertical axis through a plurality of rotating positions in relation to the base panel 610. Further, the vertical axis may be perpendicular to the at least one rising panel 608. Further the at least one rising panel 608 may be configured to support the at least one aerial vehicle 614. Further, upon rotating the at least one rising panel 608, the at least one rotating mechanism may facilitate aligning the at least one aerial vehicle 614 with at least one pod 620. Further, the at least one pod 620 may accommodate at least one payload. Further, the at least one payload may include a passenger, a cargo, etc.

FIG. 7 is a perspective view of the mobile launch pad 600, in accordance with exemplary embodiments.

Figure 8:
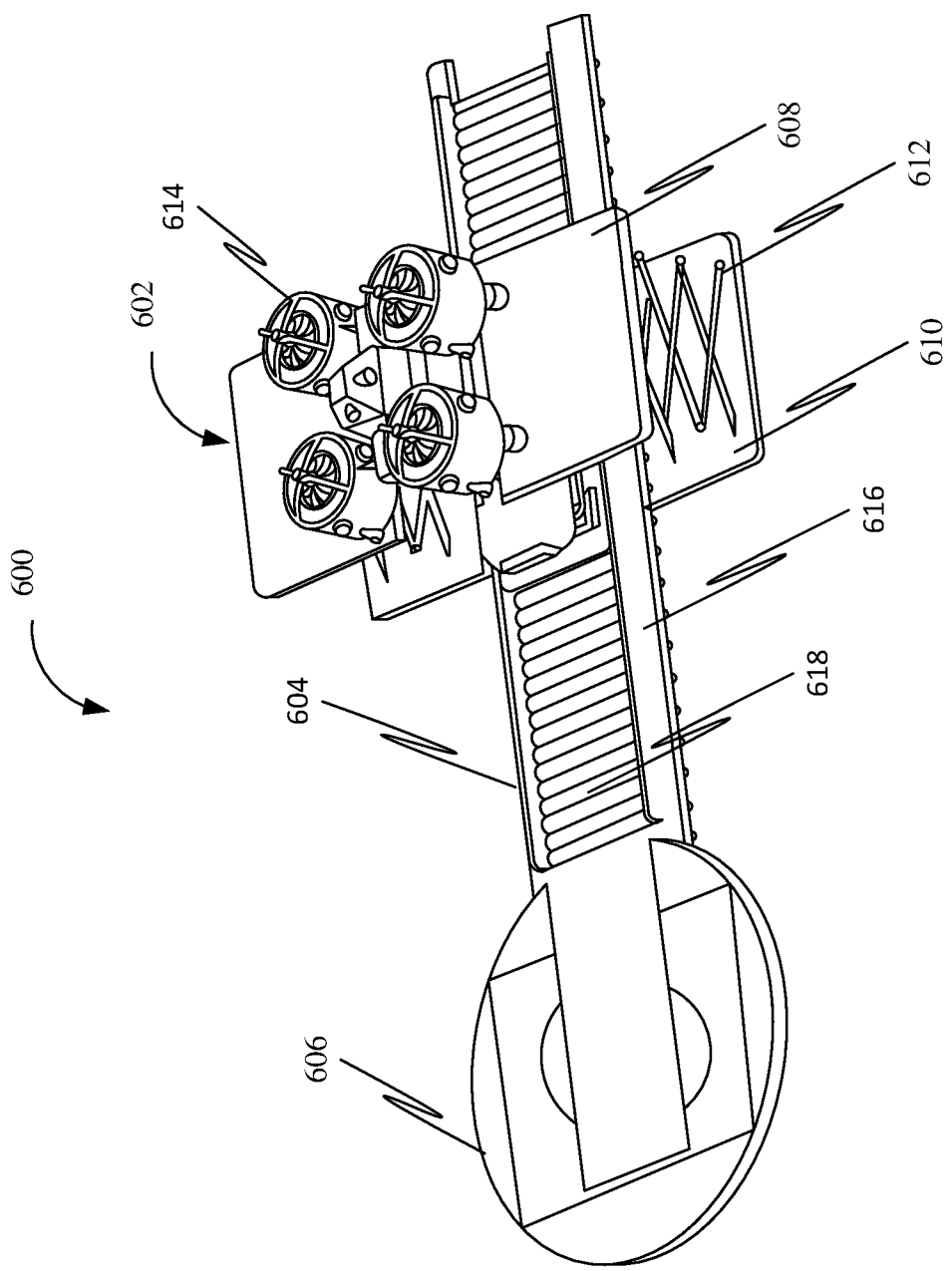
FIG. 8 is a perspective view of the mobile launch pad with the platform, in accordance with exemplary embodiments.

FIG. 8 is a perspective view of the mobile launch pad 600 with the platform 602, in accordance with exemplary embodiments.

Figure 9:
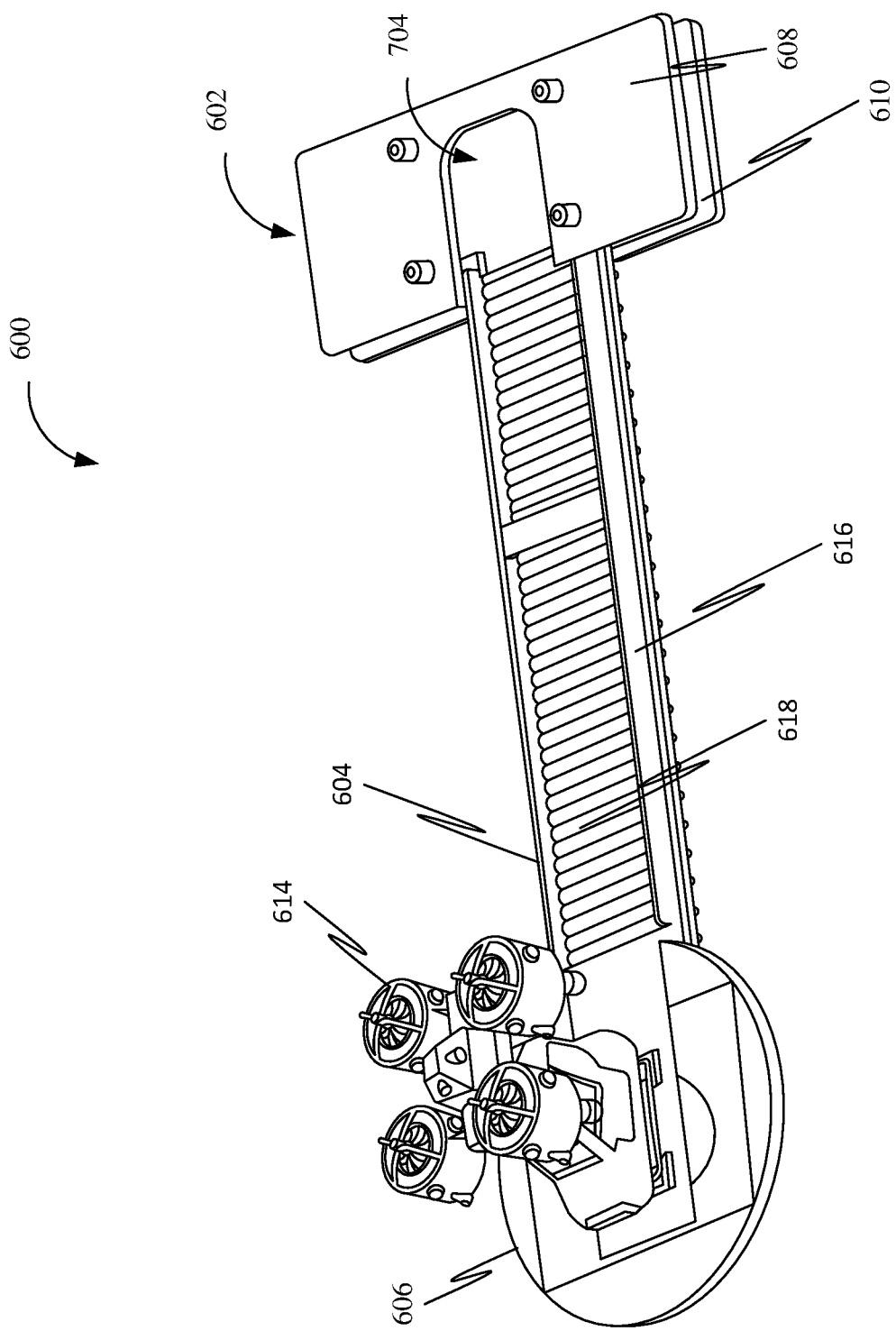
FIG. 9 is a perspective side view of the mobile launch pad getting ready for takeoff from the launch platform, in accordance with exemplary embodiments.

FIG. 9 is a perspective side view of the mobile launch pad 600 getting ready for takeoff from the launch platform 606, in accordance with exemplary embodiments.

Figure 10:
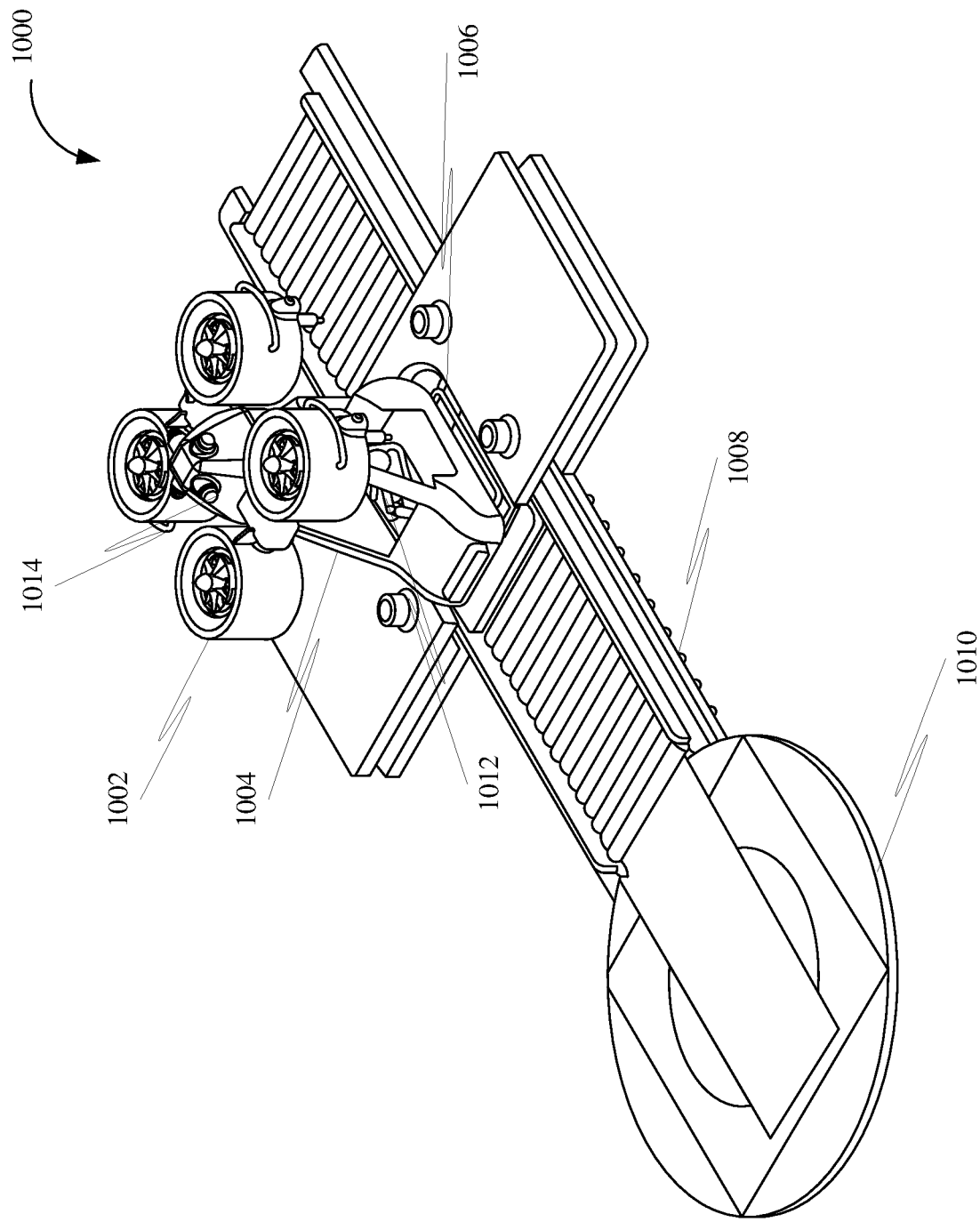
FIG. 10 is an exemplary representation of a mobile launch station, in accordance with some embodiments.

FIG. 10 is an exemplary representation of a mobile launch station 1000, in accordance with some embodiments. Accordingly, the mobile launch station 1000, in an instance, may be configured to facilitate take-off and landing of a drone taxi 1014 (comprising of a drone 1002 and a passenger pod 1004). Further, the mobile launch station 1000, in an instance, may include a stop platform 1006 coupled to a scissor lift and configured to support the drone 1002 and raise the drone 1002 to a predetermined height to facilitate mechanical coupling with the passenger pod 1004. Further, the mobile launch station 1000, in an instance, may include a mobile tram 1008 that may be configured to move the stop platform 1006 to a launching area 1010 (that may be referred to as a launching pad). Further, the mobile launch station 1000 may be a launching station that may be configured to launch the drone taxi 1014. Further, the launching pad 1010 may be circular in shape. Further, a radius associated with the launching pad may be 6'-3¹¹⁄₁₆". Further, the drone taxi 1014 may be a combination of the passenger pod 1004 and the drone 1002. Further, the passenger pod 1004, in an instance, may be a shell and/or a capsule that may be configured to house one or more passengers 1012. Further, in some embodiments, the passenger pod 1004 may also be configured to house cargo that may need to be transported from a pickup location to a destination. Further, the drone 1002, in an instance, may be configured to carry the passenger pod 1004 aerially from the pickup location to the destination. Further, the mobile launch station 1000 may be remotely controlled by a remote control station. Further, the mobile launch station 1000 may be portable and/or may be configured to be relocated from one location to another. Further, the mobile launch station 1000, in an instance, may be a mobile and transportable set of equipment that may be placed without a special need to modify or redesign any building or a rooftop. Further, the mobile launch station 1000 may not require boring underground or redesigning buildings. Further, the mobile launch station 1000 may just require a suitable flat surface such as a concrete floor. Further, the mobile launch station 1000 may require less investment as compared to known airport runway roof systems. Further, the mobile launch station 1000 may also help to avoid heavy regulations, legislation, and permissions from local government and authorities. Further, the mobile launch station 1000, in an instance, may be installed for launch and/or take off in areas that may be closer to public use. Further, the mobile launch station 1000 may be located in places such as (but not limited to) existing parking lots, open lots, grass parks, pavements, church lots, and/or any place that may include open space and/or a concrete pad. Further, the mobile launch station 1000, in an instance, may be designed to load, dock, and/or couple the passenger pod 1004 and the drone 1002 to form the drone taxi 1014. Further, the mobile launch station 1000 may offer flexibility to the drone taxi 1014 to land or launch from any location the one or more passengers 1012 may desire.

In an exemplary embodiment, the mobile launch station 1000 may be a small footprint landing pad. Further, the landing pad may be a small non-movable pad that may provide a permanent location for the drone taxis 1014. Further, the small footprint landing pad, in some embodiments, may be a bus stop styled roof and/or a stretched out landing pad. Further, the bus stop styled roof and/or the stretched out landing pad, in an instance, may provide a large diameter landing pad. Further, the large diameter landing pad, in an instance, may be required in certain scenarios, where it is difficult to ensure pinpoint accuracy for landings. In some scenarios, a 10-foot marginal error for landing may be required by the drone taxi 1014. Further, the small footprint landing pad may have a small footprint and may not be an eyesore to general public.

Figure 11:
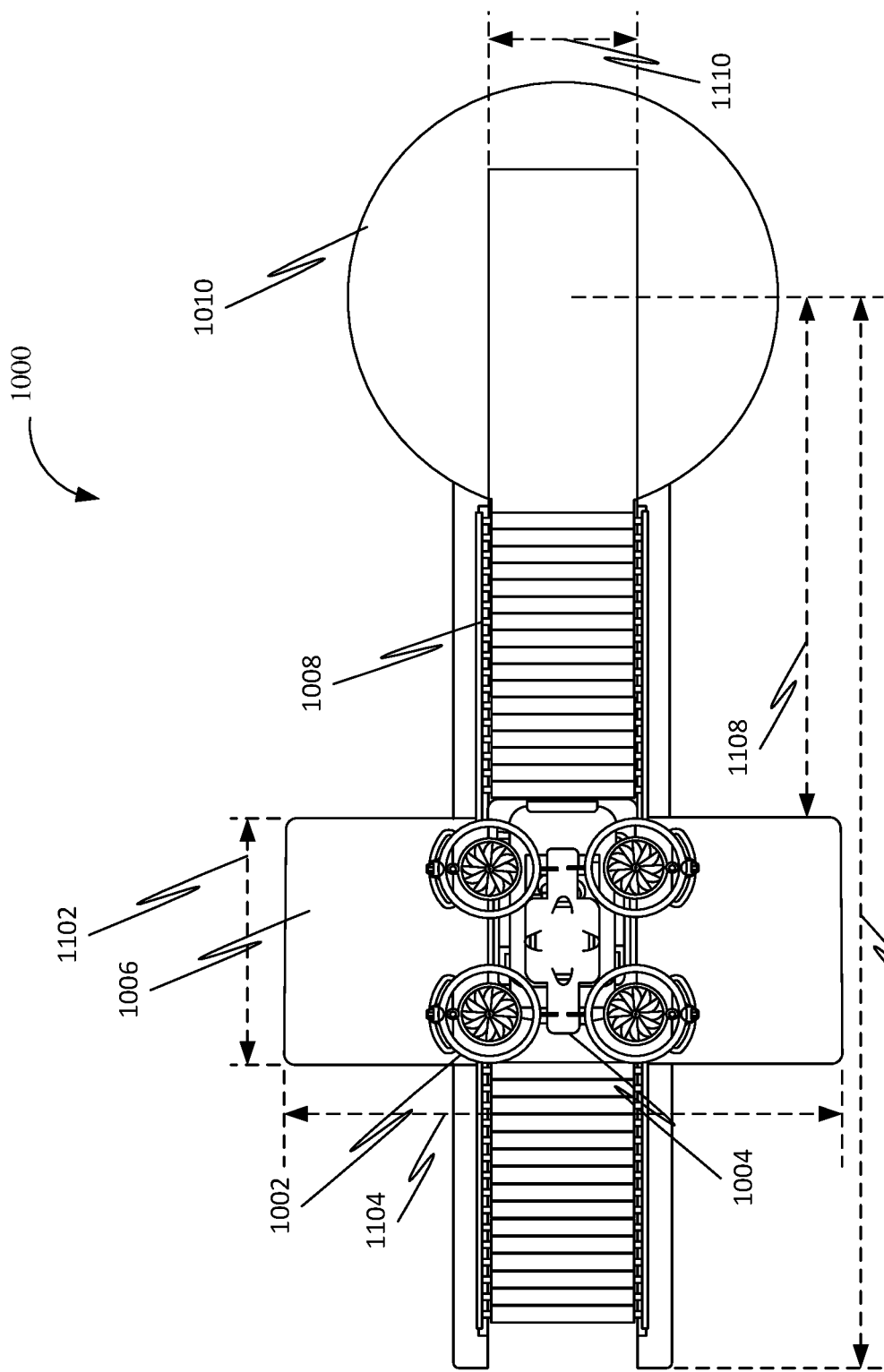
FIG. 11 is a top view of the mobile launch station, in accordance with exemplary embodiments.

FIG. 11 is a top view of the mobile launch station 1000, in accordance with exemplary embodiments. Further, a width 1102 associated with the mobile launch station 1000 may be 7'-4¹¹⁄₁₆". Further, a length 1104 associated with the mobile launch station 1000 may be 16'-8⅛". Further, a width 1106 associated with the mobile launch station 1000 may be 32'-2⅛". Further, a width 1108 associated with the mobile launch station 1000 may be 15'-7¹³⁄₁₆". Further, a length 1110 associated with the mobile launch station 1000 may be 4'6".

Figure 12:
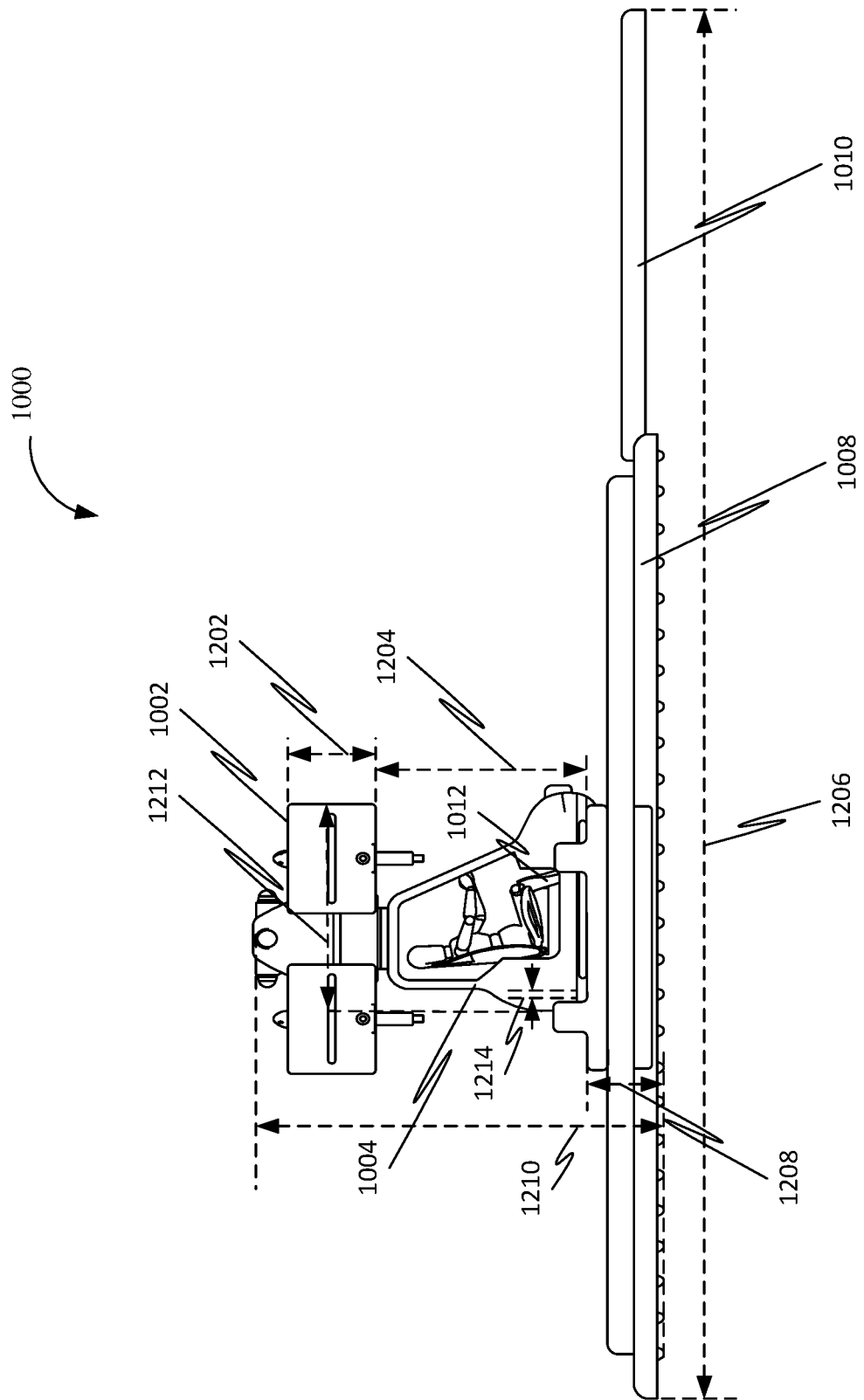
FIG. 12 is a side view of the mobile launch station, in accordance with exemplary embodiments.

FIG. 12 is a side view of the mobile launch station 1000, in accordance with exemplary embodiments. Further, a height 1202 associated with the mobile launch station 1000 may be 2'-1". Further, a height 1204 associated with the mobile launch station 1000 may be 4'-11⅛". Further, a width 1206 associated with the mobile launch station 1000 may be 38'-7¹³⁄₁₆". Further, a height 1208 associated with the mobile launch station 1000 may be 1'-9¼". Further, a height 1210 associated with the mobile launch station 1000 may be 9'6⁷⁄₁₆". Further, a width 1212 associated with the mobile launch station 1000 may be 5'-8⁷⁄₁₆". Further, a width 1214 associated with the mobile launch station 1000 may be 3⁹⁄₁₆".

Figure 13:
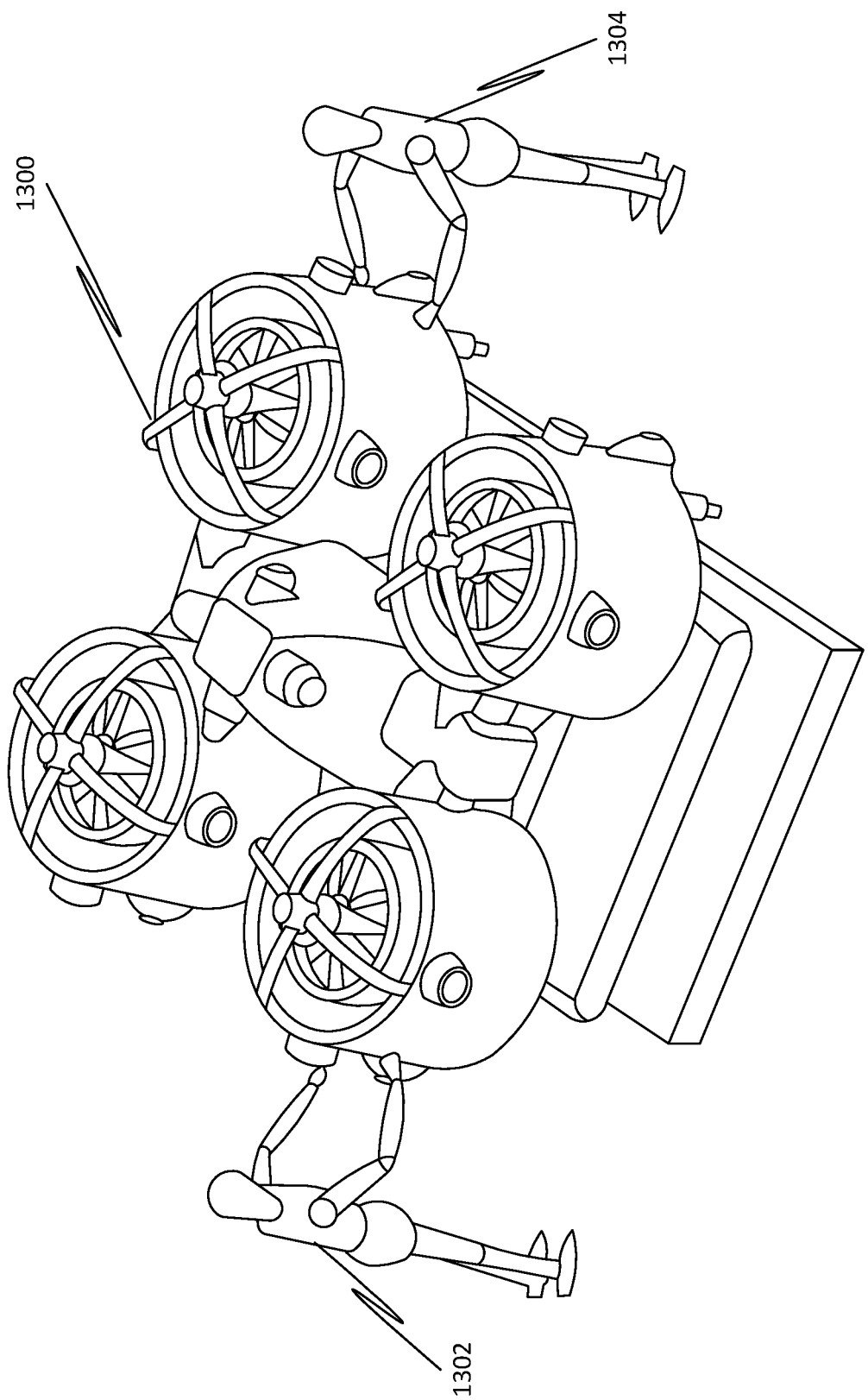
FIG. 13 is an exemplary representation of a drone being manually inspected by qualified technical staff, in accordance with exemplary embodiments.

FIG. 13 is an exemplary representation of a drone 1300 being manually inspected by qualified technical staff, in accordance with exemplary embodiments. Accordingly, the drone 1300 may be manually inspected and/or undergo maintenance before the drone 1300 may be placed on top of the passenger pod. Further, the qualified technical staff may include a plurality of technicians 1302-1304.

FIG. 14 is a perspective view of a drone 1402 being lifted up by using a forklift, in accordance with exemplary embodiments. Accordingly, the forklift 1404 may position the drone 1402 into a pair of positioning feet holders on the mobile launch station. Further, the positioning of the drone 1402 may be performed by a qualified technical staff 1406.

Figure 15:
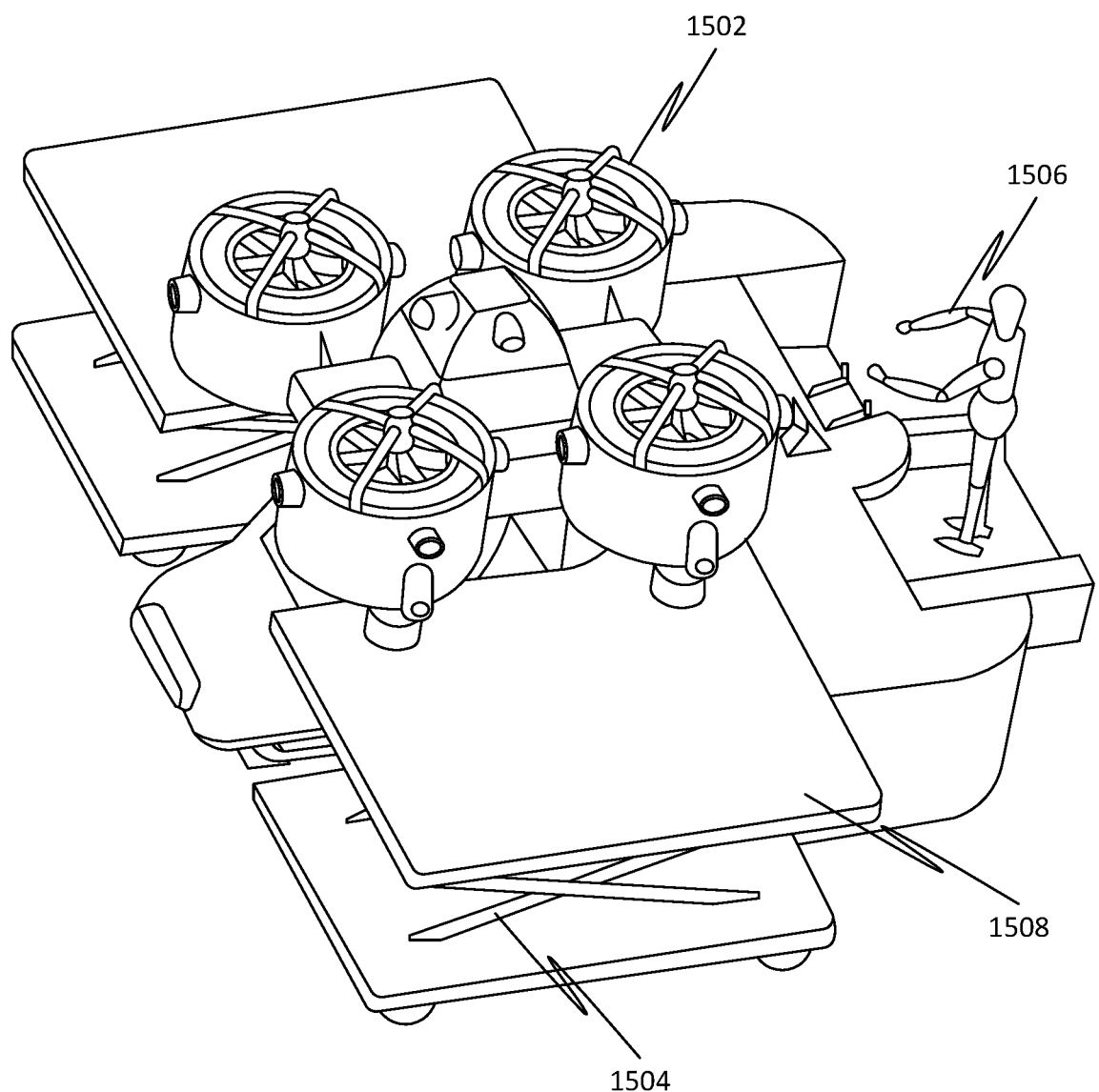
FIG. 15 is a perspective view of a drone being positioned on the pair of positioning feet holders, in accordance with exemplary embodiments.

FIG. 15 is a perspective view of a drone 1502 being positioned on the pair of positioning feet holders, in accordance with exemplary embodiments. Accordingly, the drone 1502 may be positioned on the pair of positioning feet holders to mechanically couple the drone 1502 with the passenger pod. Further, the coupling of the drone 1502 may be performed by a qualified technical staff 1506. Further, the qualified technical staff may control the motion of a scissor lift 1504 and a stop platform 1508.

Figure 16:
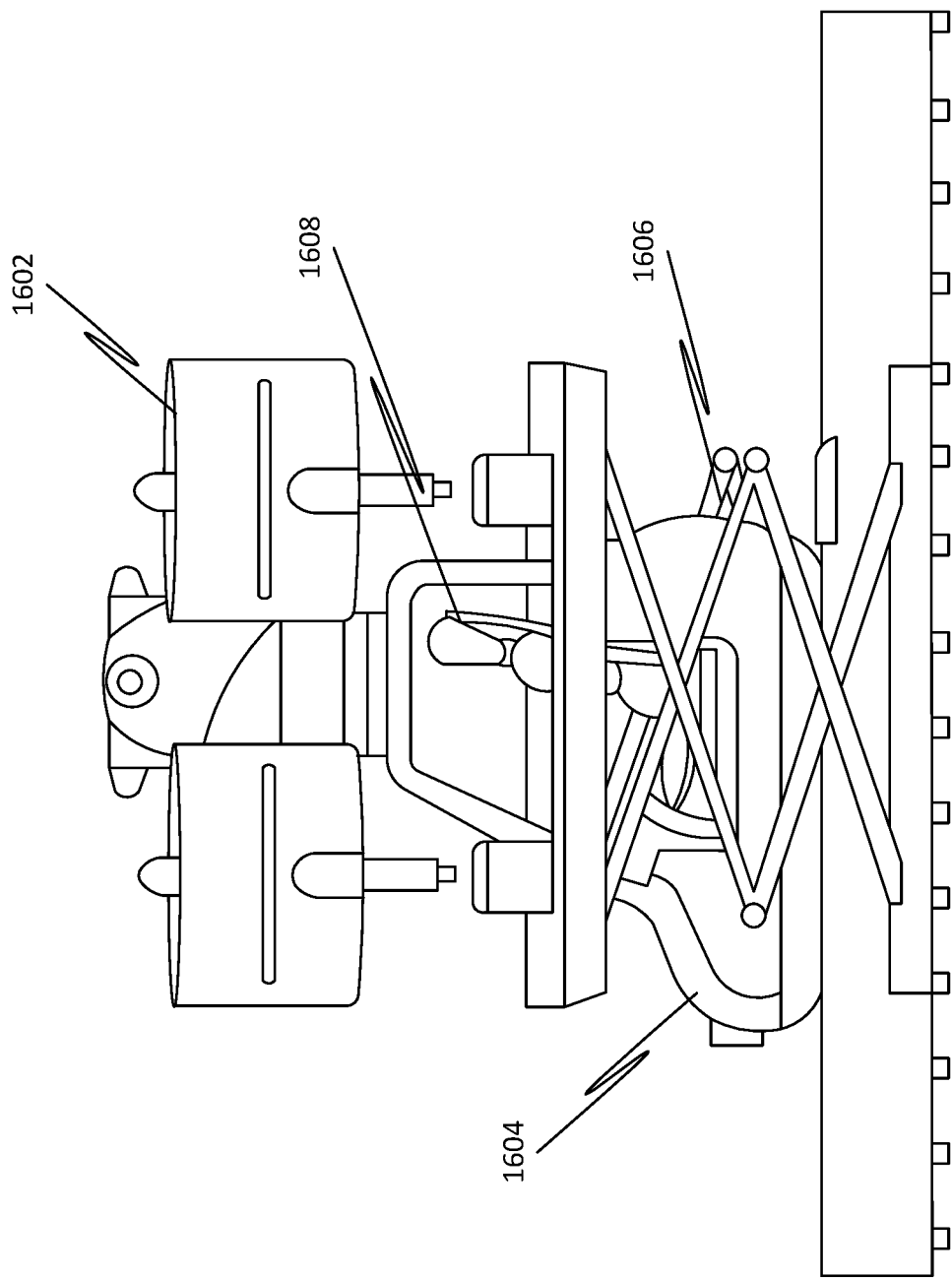
FIG. 16 is a side view of a drone being placed on a passenger pod, in accordance with exemplary embodiments.

FIG. 16 is a side view of a drone 1602 being placed on a passenger pod 1604, in accordance with exemplary embodiments. Accordingly, the done 1602 may be placed on the passenger pod 1604 by using scissor lift 1606. Further, the passenger pod 1604 may be operated by at least one passenger 1608.

Figure 17:
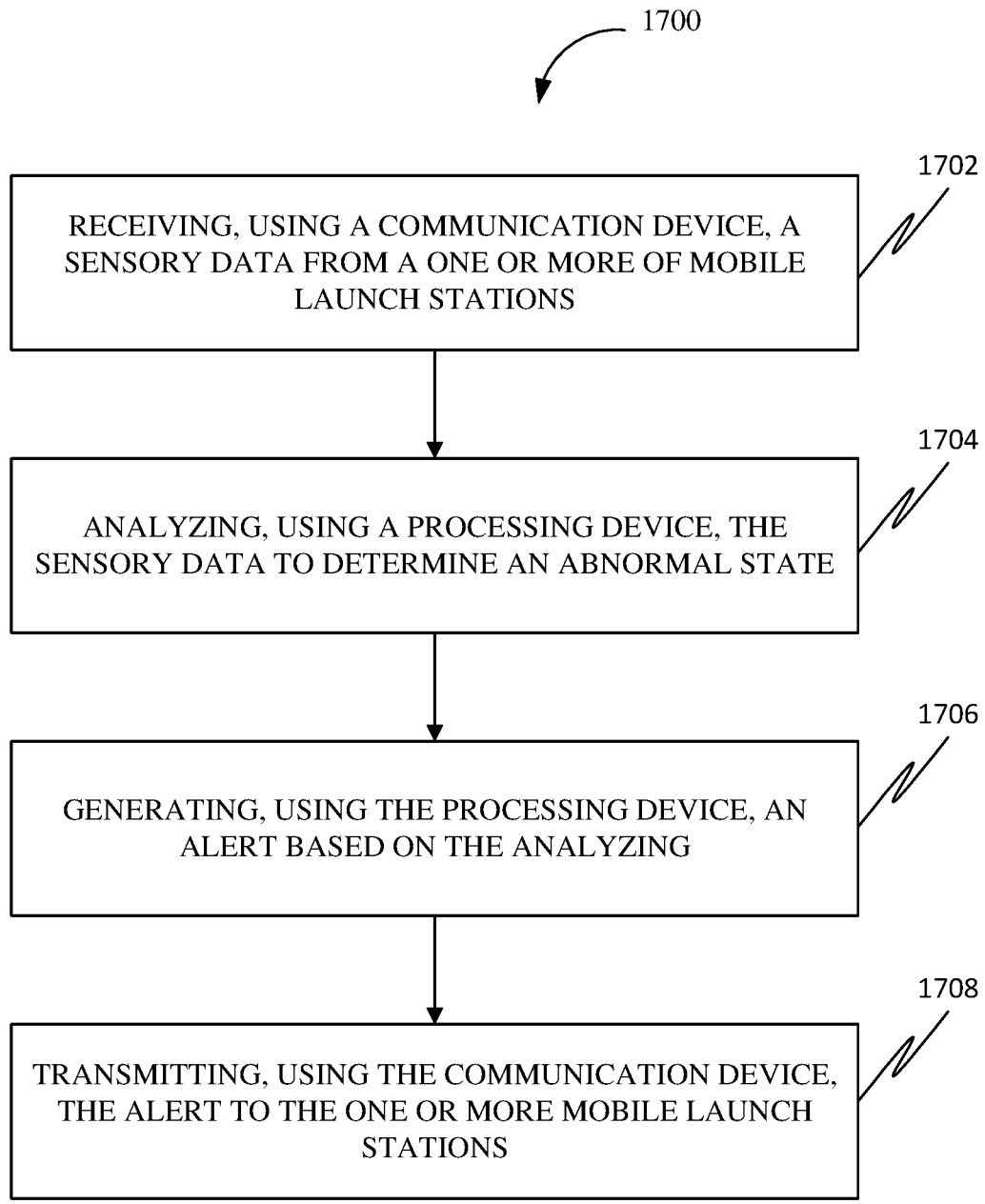
FIG. 17 is a flowchart of a method to facilitate generating an alert based on a sensory data received from a one or more of mobile launch stations, in accordance with some embodiments.

FIG. 17 is a flowchart of a method 1700 to facilitate generating an alert based on a sensory data received from a one or more of mobile launch stations, in accordance with some embodiments. Accordingly, at 1702, the method 1700 may include a step of receiving, using a communication device, a sensory data from a one or more of mobile launch stations. Further, the one or more mobile launch stations, in an instance, may be configured to facilitate take-off and landing of a drone taxi (comprising of a drone and a passenger pod). Further, each of the mobile launch station of the one or more mobile launch stations, in an instance, may include a stop platform coupled to a scissor lift and configured to support the drone and raise the drone to a predetermined height to facilitate mechanical coupling with the passenger pod. Further, the one or more mobile launch stations, in an instance, may include a mobile tram that may be configured to move the stop platform to a launching area (that may be referred to as a launching pad). Further, the passenger pod, in an instance, may be a shell and/or a capsule that may be configured to house one or more of passengers (such as commuters, and/or travelers etc.). Further, in some embodiments, the passenger pod may also be configured to house any entity (such as cargo) that may need to be transported from a pickup location to a destination. Further, the drone, in an instance, may be configured to carry the passenger pod aerially from the pickup location to the destination. Further, the sensory data, in an instance, may be any data that may be sensed by one or more of sensors that may be located at the one or more mobile launch stations. Further, the sensory data, in an instance, may include, but not limited to, audio data, video data, audiovisual data, location data, temperature information, weight data etc. Further, the one or more sensors, in an instance, may be devices that may be configured to sense data variables associated with the one or more mobile launch stations and/or may be configured to convert the data variables into a digital form that may be analyzed by the online platform 100. Further, the one or more sensors, in an instance, may include, but not limited to, cameras, microphones, ultrasonic sensors, temperature sensors, biometric sensors, pressure sensors etc. For instance, the sensory data from the one or more sensors (such as the camera) may include pictures and/or videos (that may be live and/or prerecorded) of the mobile launch station and a surrounding associated with the mobile launch station. Further, in another instance, the sensory data from the one or more sensors (such as temperature sensor) may include a temperature of various components of the mobile launch station (such as the passenger pod or the surrounding of the mobile launch station). Further, in another instance, the sensory data from the one or more sensors (such as weight sensor) may include a weight associated with the one or more passengers and/or weight of luggage if any. Further, in another instance, the sensory data from the one or more sensors (such as a thermal sensor) may include heat information that may be generated by various equipment of the mobile launch station.

Further, at 1704, the method 1700 may include a step of analyzing, using a processing device, the sensory data to determine an abnormal state. Accordingly, the online platform 100, in an instance, may be configured to analyze and/or process the sensory data received from the one or more mobile launch stations to determine the abnormal state based on the machine learning and/or AI techniques. Further, the abnormal state, in an instance, may be any situation that may reflect an anomaly in an operation associated with the one or more mobile launch station. For instance, the online platform 100 may analyze the sensory data (such as a video data) from the camera sensor that may be present in the passenger pod to determine the abnormal state such as when the passenger pod may be overloaded (such as when a number of passengers in the passenger pod may reach beyond a threshold limit). Further, in another instance, the online platform 100 may analyze the sensory data (such as a pressure data) from the pressure sensor that may be present in the passenger pod to determine the abnormal state such as when an unforeseen change in wind pressure inside the passenger pod may be analyzed.

Further, at 1706, the method 1700 may include a step of generating, using the processing device, an alert based on the analyzing. Accordingly, the alert, in an instance, may be any response from the online platform 100 that may be configured to notify and/or alert appropriate authorities (such as, but not limited to, skilled team of remote pilots, engineers, and so on.) about the abnormal state that may be determined by the online platform 100 based on the analyses of the sensory data received from the one or more mobile launch stations.

Further, at 1708, the method 1700 may include a step of transmitting, using the communication device, the alert to the one or more mobile launch stations. Accordingly, the online platform 100, in an instance, may be configured to transmit the alert to the one or more mobile launch stations through a wireless transmitter. The wireless transmitter, in an instance, may transmit the alert over, but not limited to, a Wi-Fi, a Bluetooth, an electromagnetic waveform, ultrasound, cellular (5G) and/or an Infra-red, etc.

Figure 18:
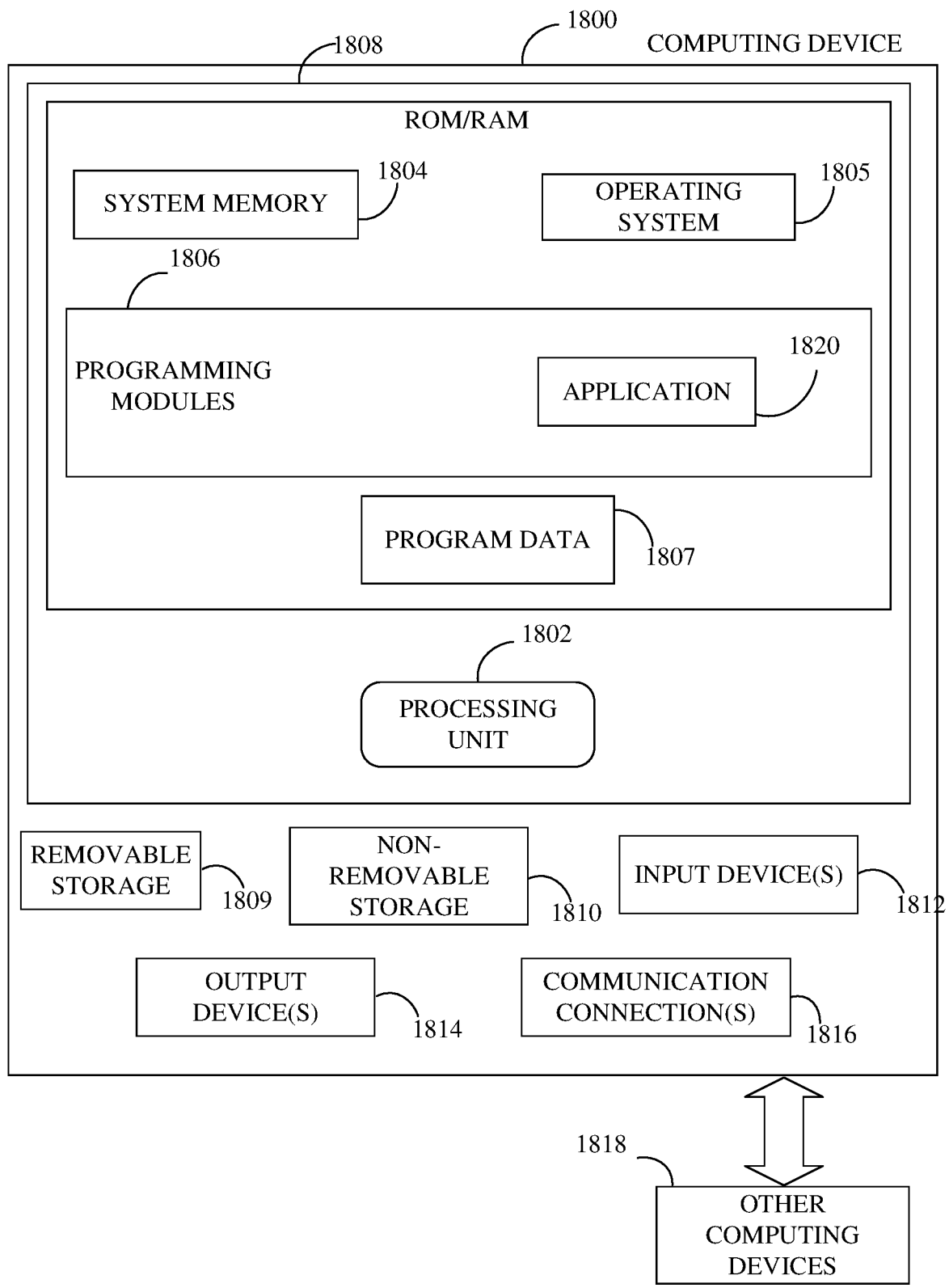
FIG. 18 is a block diagram of a computing device for implementing the methods disclosed herein, in accordance with some embodiments.

With reference to FIG. 18, a system consistent with an embodiment of the disclosure may include a computing device or cloud service, such as computing device 1800. In a basic configuration, computing device 1800 may include at least one processing unit 1802 and a system memory 1804. Depending on the configuration and type of computing device, system memory 1804 may comprise, but is not limited to, volatile (e.g. random-access memory (RAM)), non-volatile (e.g. read-only memory (ROM)), flash memory, or any combination. System memory 1804 may include operating system 1805, one or more programming modules 1806, and may include a program data 1807. Operating system 1805, for example, may be suitable for controlling computing device 1800's operation. In one embodiment, programming modules 1806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 18 by those components within a dashed line 1808.

Computing device 1800 may have additional features or functionality. For example, computing device 1800 may also include additional data storage devices (removable and/or non-removable) such as, for example, magnetic disks, optical disks, or tape. Such additional storage is illustrated in FIG. 18 by a removable storage 1809 and a non-removable storage 1810. Computer storage media may include volatile and non-volatile, removable and non-removable media implemented in any method or technology for storage of information, such as computer-readable instructions, data structures, program modules, or other data. System memory 1804, removable storage 1809, and non-removable storage 1810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1800. Any such computer storage media may be part of device 1800. Computing device 1800 may also have input device(s) 1812 such as a keyboard, a mouse, a pen, a sound input device, a touch input device, a location sensor, a camera, a biometric sensor, etc. Output device(s) 1814 such as a display, speakers, a printer, etc. may also be included. The aforementioned devices are examples and others may be used.

Computing device 1800 may also contain a communication connection 1816 that may allow device 1800 to communicate with other computing devices 1818, such as over a network in a distributed computing environment, for example, an intranet or the Internet. Communication connection 1816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1804, including operating system 1805. While executing on processing unit 1802, programming modules 1806 (e.g., application 1820 such as a media player) may perform processes including, for example, one or more stages of methods, algorithms, systems, applications, servers, databases as described above. The aforementioned process is an example, and processing unit 1802 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The following is claimed:

1. A mobile launch pad for facilitating launching and landing of flying taxis, the mobile launch pad comprising:
   a platform comprises at least one rising panel, a base panel, and at least one lift mechanism, wherein the at least one rising panel is coupled to the base panel using the at least one lift mechanism, wherein the at least one lift mechanism is configured to move the at least one rising panel through at least two panel positions in relation to the base panel, wherein the at least one rising panel in the at least two positions is configured to support at least one aerial vehicle of a flying taxi; and at least one propulsion assembly operationally coupled with the platform, wherein the at least one propulsion assembly is configured for propelling the platform.

2. The mobile launch pad of claim 1, wherein the at least one rising panel comprises a rising panel cutaway, wherein the base panel comprises a base panel cutaway, wherein each of the rising panel cutaway and the base panel cutaway forms a panel space, wherein the panel space is configured to accommodate the flying taxi.

3. The mobile launch pad of claim 1, wherein the at least one rising panel comprises a first rising panel and a second rising panel, wherein the first rising panel is separated from the second rising panel by a rising panel space, wherein the base panel comprises a first base panel and a second base panel, wherein the first base panel is separated from the second base panel by a base panel space, wherein each of the rising panel space and the base panel space forms a panel space, wherein the panel space is configured to accommodate the flying taxi.

4. The mobile launch pad of claim 3, wherein the at least one lift mechanism is configured to move the first rising panel and the second rising panel through the at least two panel positions in relation to the base panel synchronously, wherein the first rising panel and the second rising panel in the at least two panel positions is configured to support the at least one aerial vehicle.

5. The mobile launch pad of claim 3, wherein the at least one lift mechanism is configured to move the first rising panel and the second rising panel through the at least two panel positions in relation to the base panel asynchronously, wherein the first rising panel and the second rising panel in the at least two panel positions is configured to support the at least one aerial vehicle.

6. The mobile launch pad of claim 1 further comprising:
at least one platform sensor disposed on the at least one rising panel, wherein the at least one platform sensor is configured to generate at least one platform sensor data corresponding to at least one physical state of the at least one aerial vehicle; and
a processing device communicatively coupled with the at least one platform sensor, wherein the processing device is configured for:
analyzing the at least one platform sensor data; and
generating at least one platform command based on the analyzing, wherein the at least one lift mechanism is communicatively coupled with the processing device, wherein the at least one lift mechanism is controllable by the processing device, wherein the at least one lift mechanism is configured for transitioning the at least one rising panel between the at least two panel positions based on the at least one platform command.

7. The mobile launch pad of claim 6, wherein the processing device is further configured for generating at least one vehicle notification based on the analyzing, wherein the mobile launch pad further comprising a presentation device communicatively coupled with the processing device, wherein the presentation device is configured for presenting the at least one vehicle notification.

8. The mobile launch pad of claim 1 further comprising:
at least one propeller sensor disposed on at least one of a rising panel and the base panel, wherein the at least one propeller sensor is configured to generate at least one propeller sensor data, wherein the at least one propeller sensor data corresponds to at least one physical state of the flying taxi; and
a processing device communicatively coupled with the at least one propeller sensor, wherein the processing device is configured for:
analyzing the at least one propeller sensor data; and
generating at least one propeller command based on the analyzing, wherein the at least one propulsion assembly communicatively coupled with the processing device, wherein the at least one propulsion assembly is controllable by the processing device, wherein the at least one propulsion assembly is configured for propelling the platform in relation to the flying taxi based on the at least one propeller command.

9. The mobile launch pad of claim 1, wherein the platform comprises at least one rotating mechanism, wherein the at least one rising panel is coupled to the base panel using the at least one rotating mechanism, wherein the at least one rotating mechanism is configured to rotate the at least one rising panel around a vertical axis through a plurality of rotating positions in relation to the base panel, wherein the vertical axis is perpendicular to the at least one rising panel, wherein the at least one rising panel is configured to support the at least one aerial vehicle.

10. The mobile launch pad of claim 9 further comprising:
at least one panel sensor disposed on the at least one rising panel, wherein the at least one panel sensor is configured to generate at least one panel sensor data corresponding to at least one physical state of the at least one aerial vehicle; and
a processing device communicatively coupled with the at least one panel sensor, wherein the processing device is configured for:
analyzing the at least one panel sensor data; and
generating at least one panel command based on the analyzing, wherein the at least one rotating mechanism is communicatively coupled with the processing device, wherein the at least one rotating mechanism is controllable by the processing device, wherein the at least one rotating mechanism is configured to rotate the at least one rising panel through the plurality of rotating positions based on the at least one panel command.

11. The mobile launch pad of claim 1, wherein the at least one propulsion assembly comprises a conveyor assembly, wherein the conveyor assembly comprises a stationary member and a moving member, wherein the stationary member comprises a stationary body, wherein the stationary body extends to at least one body length, wherein the moving member is configured to move through a plurality of member positions in relation to the stationary body corresponding to the at least one body length, wherein the moving member and the stationary member is configured for propelling the platform through the plurality member positions.

12. The mobile launch pad of claim 11 further comprising at least one launching panel operationally coupled with the conveyor assembly, wherein the at least one launching panel is configured support the flying taxi during landing and take-off of the flying taxi, wherein the conveyor assembly is configured to propel the platform to the at least one launching panel.

13. A mobile launch pad for facilitating launching and landing of flying taxis, the mobile launch pad comprising:
- a platform comprises at least one rising panel, a base panel, and at least one lift mechanism, wherein the at least one rising panel is coupled to the base panel using the at least one lift mechanism, wherein the at least one lift mechanism is configured to move the at least one rising panel through at least two panel positions in relation to the base panel, wherein the at least one rising panel is configured to support at least one aerial vehicle of a flying taxi;
- at least one conveyor assembly operationally coupled with the platform, wherein the at least one conveyor assembly comprises a stationary member and a moving member, wherein the stationary member comprises a stationary body, wherein the stationary body extends to at least one body length, wherein the moving member is configured to move through a plurality of member positions in relation to the stationary body corresponding to the at least one body length, wherein the at least one conveyor assembly is configured for propelling the platform through the plurality of member positions; and
- a launch platform comprises a launch panel movably disposed on the launch platform, wherein the launch platform is operationally coupled with the at least one conveyor assembly, wherein the launch panel is configured to support the flying taxi during landing and take-off of the flying taxi, wherein the at least one conveyor assembly is configured to move the launch panel through the plurality of member positions.

14. The mobile launch pad of claim 13, wherein the at least one rising panel comprises a rising panel cutaway, wherein the base panel comprises a base panel cutaway, wherein each of the rising panel cutaway and the base panel cutaway forms a panel space, wherein the panel space is configured to accommodate the flying taxi.

15. The mobile launch pad of claim 13, wherein the at least one rising panel comprises a first rising panel and a second rising panel, wherein the first rising panel is separated from the second rising panel by a rising panel space, wherein the base panel comprises a first base panel and a second base panel, wherein the first base panel is separated from the second base panel by a base panel space, wherein each of the rising panel space and the base panel space forms a panel space, wherein the panel space is configured to accommodate the flying taxi.

16. The mobile launch pad of claim 15, wherein the at least one lift mechanism is configured to move the first rising panel and the second rising panel through the at least two panel positions in relation to the base panel synchronously, wherein the first rising panel and the second rising panel in the at least two panel positions is configured to support the at least one aerial vehicle.

17. The mobile launch pad of claim 15, wherein the at least one lift mechanism is configured to move the first rising panel and the second rising panel through the at least two panel positions in relation to the base panel asynchronously, wherein the first rising panel and the second rising panel in the at least two panel positions is configured to support the at least one aerial vehicle.

18. The mobile launch pad of claim 13 further comprising:
- at least one platform sensor disposed on the at least one rising panel, wherein the at least one platform sensor is configured to generate at least one platform sensor data corresponding to at least one physical state of the at least one aerial vehicle; and
- a processing device communicatively coupled with the at least one platform sensor, wherein the processing device is configured for:
  analyzing the at least one platform sensor data; and
  generating at least one platform command based on the analyzing, wherein the at least one lift mechanism is communicatively coupled with the processing device, wherein the at least one lift mechanism is controllable by the processing device, wherein the at least one lift mechanism is configured for transitioning the at least one rising panel between the at least two panel positions based on the at least one platform command.

19. The mobile launch pad of claim 18, wherein the processing device is further configured for generating at least one vehicle notification based on the analyzing, wherein the mobile launch pad further comprising a presentation device communicatively coupled with the processing device, wherein the presentation device is configured for presenting the at least one vehicle notification.

20. The mobile launch pad of claim 13, wherein the platform comprises at least one rotating mechanism, wherein the at least one rising panel is coupled to the base panel using the at least one rotating mechanism, wherein the at least one rotating mechanism is configured to rotate the at least one rising panel around a vertical axis through a plurality of rotating positions in relation to the base panel, wherein the vertical axis is perpendicular to the at least one rising panel, wherein the at least one rising panel is configured to support the at least one aerial vehicle.

* * * * *